US012719818B2

(12) United States Patent
Granovsky et al.

(10) Patent No.: US 12,719,818 B2
(45) Date of Patent: Aug. 25, 2026

(54) CENTRALIZED NON-SYSTEM-MEMORY GATEWAY CIRCUIT

(71) Applicant: Apple Inc., Cupertino, CA (US)

(72) Inventors: Ilya Granovsky, Kirayat Tivon (IL); Lital Levy-Rubin, Tel Aviv (IL); Lior Zimet, Kerem Maharal (IL); Sergio Kolor, Haifa (IL)

(73) Assignee: Apple Inc., Cupertino, CA (US)

( * ) Notice: Subject to any disclaimer, the term of this patent is extended or adjusted under 35 U.S.C. 154(b) by 307 days.

(21) Appl. No.: 18/404,822

(22) Filed: Jan. 4, 2024

(65) Prior Publication Data

US 2025/0094330 A1 Mar. 20, 2025

Related U.S. Application Data

(60) Provisional application No. 63/583,128, filed on Sep. 15, 2023, provisional application No. 63/583,130, filed on Sep. 15, 2023.

(51) Int. Cl.

| | |
|---|---|
| ***H04L 49/253*** | (2022.01) |
| ***G06F 12/02*** | (2006.01) |
| ***H04L 49/90*** | (2022.01) |

(52) U.S. Cl.
CPC .......... *H04L 49/254* (2013.01); *G06F 12/023* (2013.01); *H04L 49/9026* (2013.01)

(58) Field of Classification Search
None
See application file for complete search history.

(56) References Cited

U.S. PATENT DOCUMENTS 6,766,389 B2 * 7/2004 Hayter .................. G06F 13/387 709/219
7,254,603 B2 * 8/2007 Weber ..................... H04L 12/46 370/402

(Continued)

OTHER PUBLICATIONS

"Network on Chip Routing Algorithms"; Ville Rantala | Teijo Lehtonen | Juha Plosila; TUCS Technical Report No. 779, Aug. 2006; https://www.researchgate.net/publication/31596864_Network_on_Chip_Routing_Algorithms (Year: 2006).*

(Continued)

*Primary Examiner* — Michael Alsip
(74) *Attorney, Agent, or Firm* — Kowert, Hood, Munyon, Rankin & Goetzel, P.C.; Dean M. Munyon

(57) ABSTRACT

A computer system with a central, non-system memory (NSM) gateway circuit for routing non-DRAM transactions between agent circuits coupled to a plurality of networks of the computer system, which may include packet-switching capabilities. Such non-DRAM transactions may be routed via a virtual channel in some implementations. To facilitate handling of such transactions, the NSM gateway circuit may include dedicated routing storage (e.g., an input buffer for each source agent circuit on each of the plurality of networks and an output buffer for each destination agent circuit on each of the plurality of networks). The NSM gateway circuit may serve as a termination point for non-DRAM transactions within the computer system, allowing network credit for a message included in a non-DRAM transaction to be returned to a source agent circuit prior to delivery to one or more destination agent circuits.

20 Claims, 17 Drawing Sheets

(56) References Cited

U.S. PATENT DOCUMENTS

| | | | | |
|---|---|---|---|---|
| 8,526,422 | B2 * | 9/2013 | Hoover | G06F 15/7825 370/351 |
| 9,514,050 | B1 | 12/2016 | Agarwal et al. | |
| 2006/0168283 | A1 | 7/2006 | Georgiou et al. | |
| 2010/0191814 | A1 | 7/2010 | Heddes et al. | |
| 2015/0249602 | A1 | 9/2015 | Barner et al. | |
| 2019/0042240 | A1 | 2/2019 | Pappu et al. | |
| 2019/0258573 | A1 * | 8/2019 | Rowlands | H04L 45/60 |
| 2020/0401532 | A1 | 12/2020 | Chachad et al. | |

OTHER PUBLICATIONS

"ViChaR: A Dynamic Virtual Channel Regulator for Network-on-Chip Routers"; Chrysostomos A. Nicopoulos, Dongkook Park, Jongman Kim, N. Vijaykrishnan, Mazin S. Yousif, Chita R. Das; The 39th Annual (MICRO'06); https://ieeexplore.ieee.org/stamp/stamp.jsp?tp=&arnumber=4041858 (Year: 2006).*

Ciprian Seiculescu, "Design Methods and Tools for Application-Specific Predictable Networks-on-Chip," École Polytechnique Fédérale De Lausanne, Jul. 2, 2012, 244 pages.

* cited by examiner

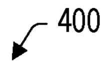
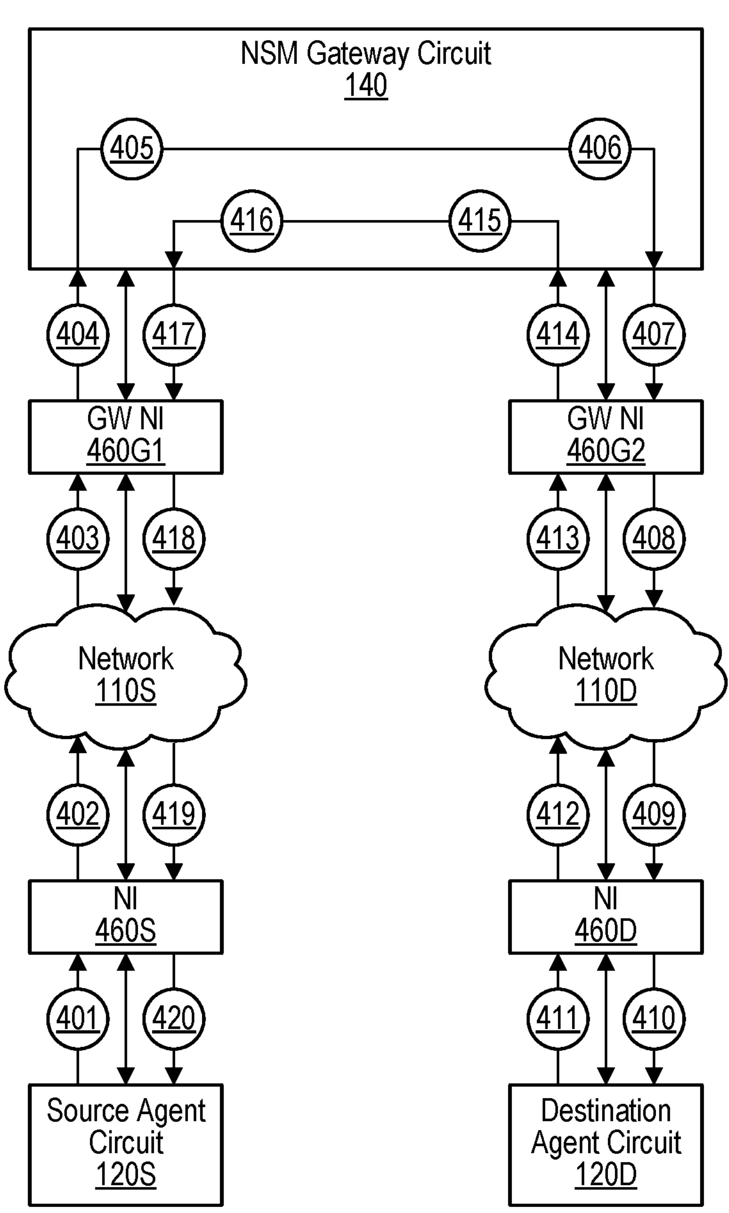
FIG. 4

Figure 7A:
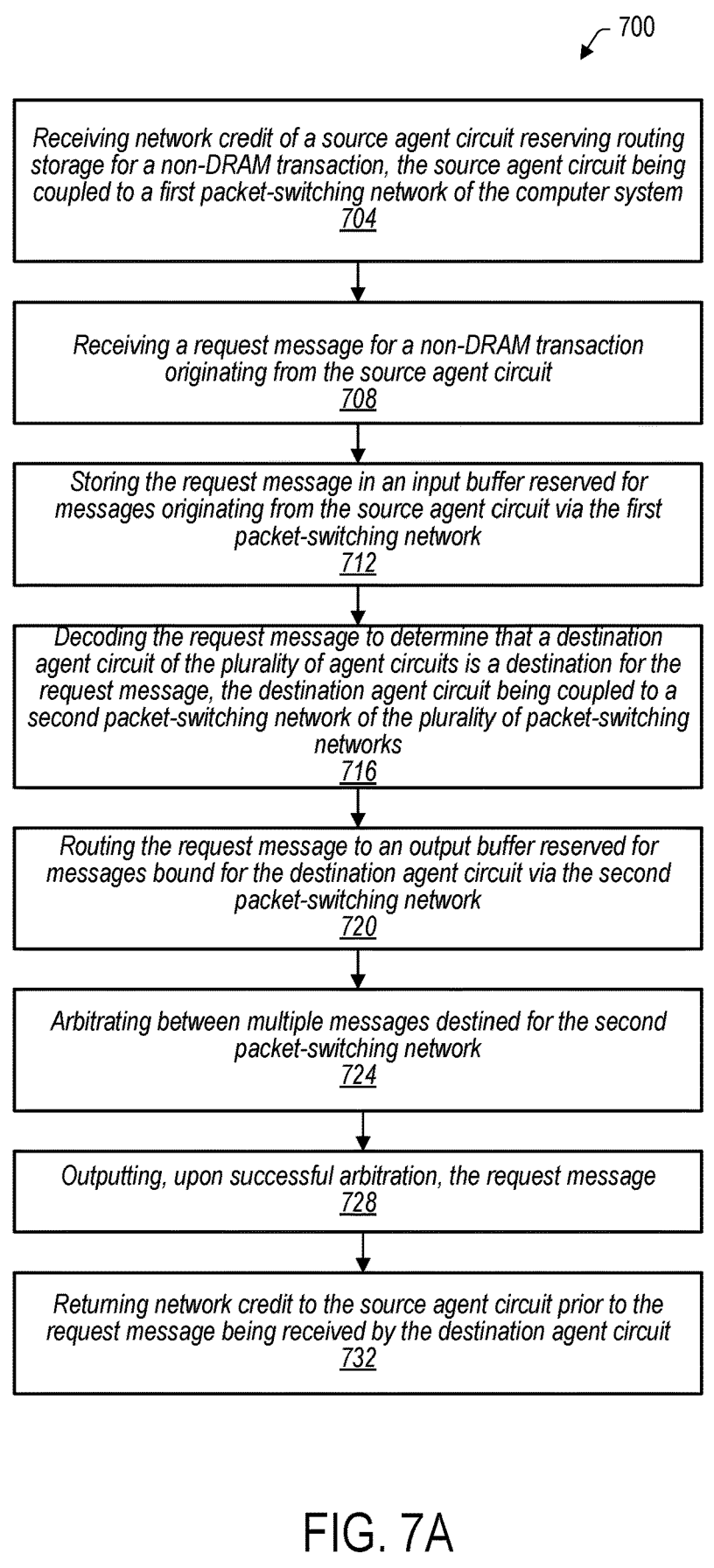

700

*Receiving network credit of a source agent circuit reserving routing storage for a non-DRAM transaction, the source agent circuit being coupled to a first packet-switching network of the computer system*
704

*Receiving a request message for a non-DRAM transaction originating from the source agent circuit*
708

*Storing the request message in an input buffer reserved for messages originating from the source agent circuit via the first packet-switching network*
712

*Decoding the request message to determine that a destination agent circuit of the plurality of agent circuits is a destination for the request message, the destination agent circuit being coupled to a second packet-switching network of the plurality of packet-switching networks*
716

*Routing the request message to an output buffer reserved for messages bound for the destination agent circuit via the second packet-switching network*
720

*Arbitrating between multiple messages destined for the second packet-switching network*
724

*Outputting, upon successful arbitration, the request message*
728

*Returning network credit to the source agent circuit prior to the request message being received by the destination agent circuit*
732

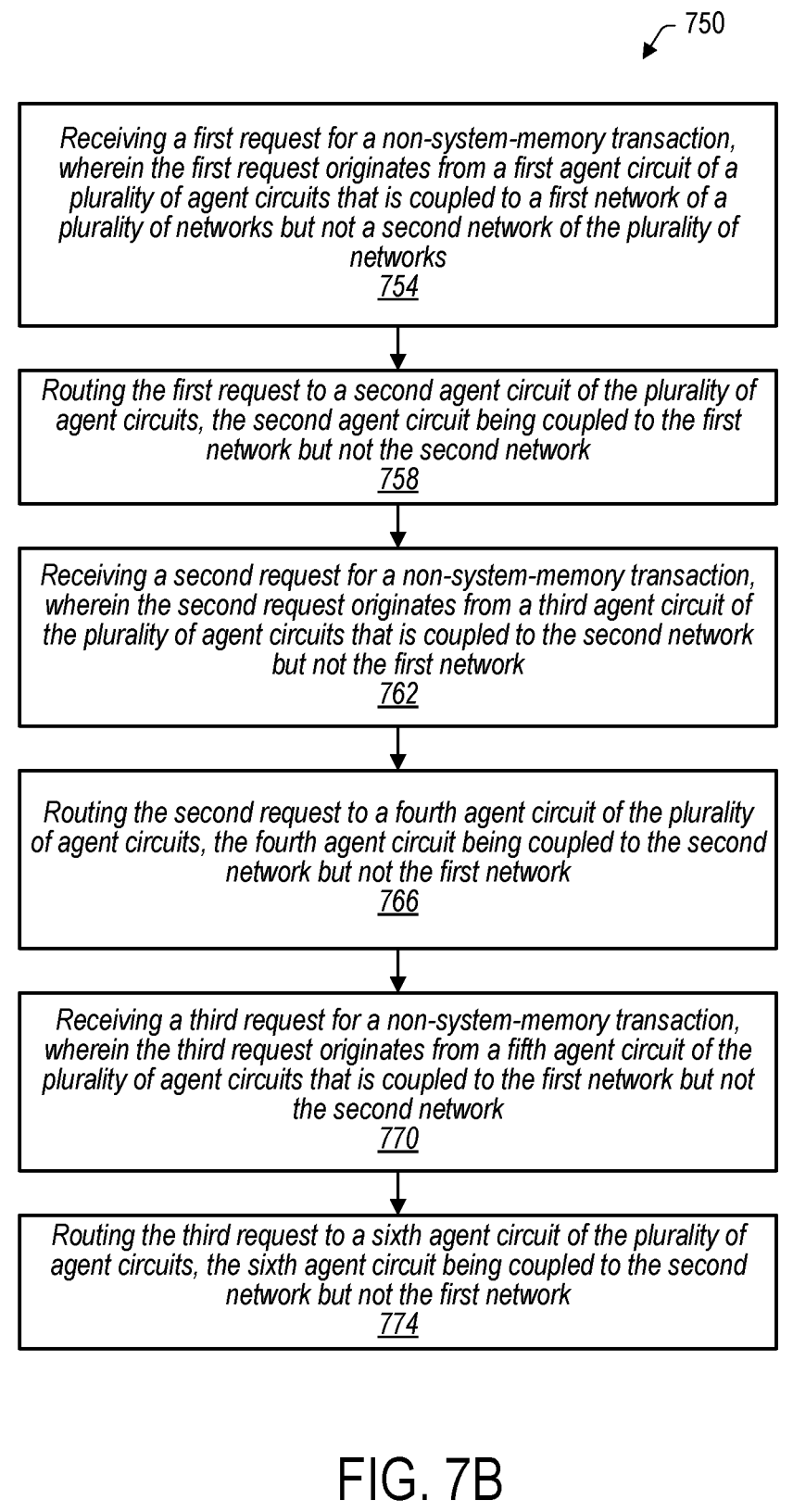

*Receiving a first request for a non-system-memory transaction, wherein the first request originates from a first agent circuit of a plurality of agent circuits that is coupled to a first network of a plurality of networks but not a second network of the plurality of networks*
754

*Routing the first request to a second agent circuit of the plurality of agent circuits, the second agent circuit being coupled to the first network but not the second network*
758

*Receiving a second request for a non-system-memory transaction, wherein the second request originates from a third agent circuit of the plurality of agent circuits that is coupled to the second network but not the first network*
762

*Routing the second request to a fourth agent circuit of the plurality of agent circuits, the fourth agent circuit being coupled to the second network but not the first network*
766

*Receiving a third request for a non-system-memory transaction, wherein the third request originates from a fifth agent circuit of the plurality of agent circuits that is coupled to the first network but not the second network*
770

*Routing the third request to a sixth agent circuit of the plurality of agent circuits, the sixth agent circuit being coupled to the second network but not the first network*
774

FIG. 7B

CENTRALIZED NON-SYSTEM-MEMORY GATEWAY CIRCUIT

CROSS REFERENCE TO RELATED APPLICATIONS

This application claims priority to U.S. Provisional Application No. 63/583,128 entitled "Centralized Non-System-Memory Gateway Circuit" filed on Sep. 15, 2023; and to U.S. Provisional Application No. 63/583,130 entitled "Gateway Circuit for Routing Multiple Types of Non-System Memory Transactions" also filed on Sep. 15, 2023. Both of these applications are incorporated by reference herein.

This application is also related to U.S. application Ser. No. 18/404,837, entitled "Gateway Circuit for Routing Multiple Types of Non-System Memory Transactions," filed on the same day as the present application; this application is also incorporated by reference herein.

BACKGROUND

Technical Field

This application relates generally to computer systems, and more specifically to the processing of non-DRAM transactions within such systems.

Description of the Related Art

Components of computer systems have been implemented at various levels of discreteness over time. For example, traditional personal computers were based on an architecture in which many separate components were connected through a central printed circuit board. This interface, commonly referred to as a motherboard, typically included many different integrated circuits, as well as slots for detachable memory cards, peripherals, etc.

In contrast, a system on a chip (SoC) is an integrated circuit (IC) that integrates most or all components of a computer or other electronic system. These components typically include on-chip central processing units (CPUs), memory interfaces, input/output devices, input/output interfaces, and secondary storage interfaces, often alongside other components such as radio modems and a graphics processing unit (GPU)—all on a single substrate or microchip. SoCs may contain digital, analog, and mixed-signal circuits, as well as radio frequency signal processing functions. Some SoCs may also be paired with dedicated and physically separate memory and secondary storage chips. Compared to a traditional multi-chip architecture, an SoC with equivalent functionality may have increased performance and reduced power consumption as well as a smaller semiconductor die area. These benefits may come at the cost of reduced replaceability of individual components with the SoC.

A variation on this monolithic design approach (that is, one in which all or many components are on the same IC) is a chiplet architecture. Chiplets are small, modular pieces of silicon that encapsulate an intellectual property (IP) subsystem such as an I/O driver, memory IC, processor core, etc. Multiple chiplets can be connected to create a complex integrated system within the same physical package. Chiplet-based architectures offer several potential benefits such as improved performance, reduced power consumption, and increased design flexibility. For example, chiplet technology may allow IPs from different vendors to be rapidly integrated into a single physical package.

BRIEF DESCRIPTION OF THE DRAWINGS

FIG. 4 is a block diagram illustrating a generic transaction flow through a centralized gateway circuit for non-DRAM transactions.

FIG. 7A is a flow diagram of one embodiment of a method for performing a non-DRAM transaction within a computer system that includes a gateway circuit and a plurality of agent circuits.

FIG. 7B is a flow diagram of one embodiment of a method for performing non-DRAM transaction within a computer system that includes a gateway circuit and a plurality of agent circuits.

DETAILED DESCRIPTION

Figure 1:
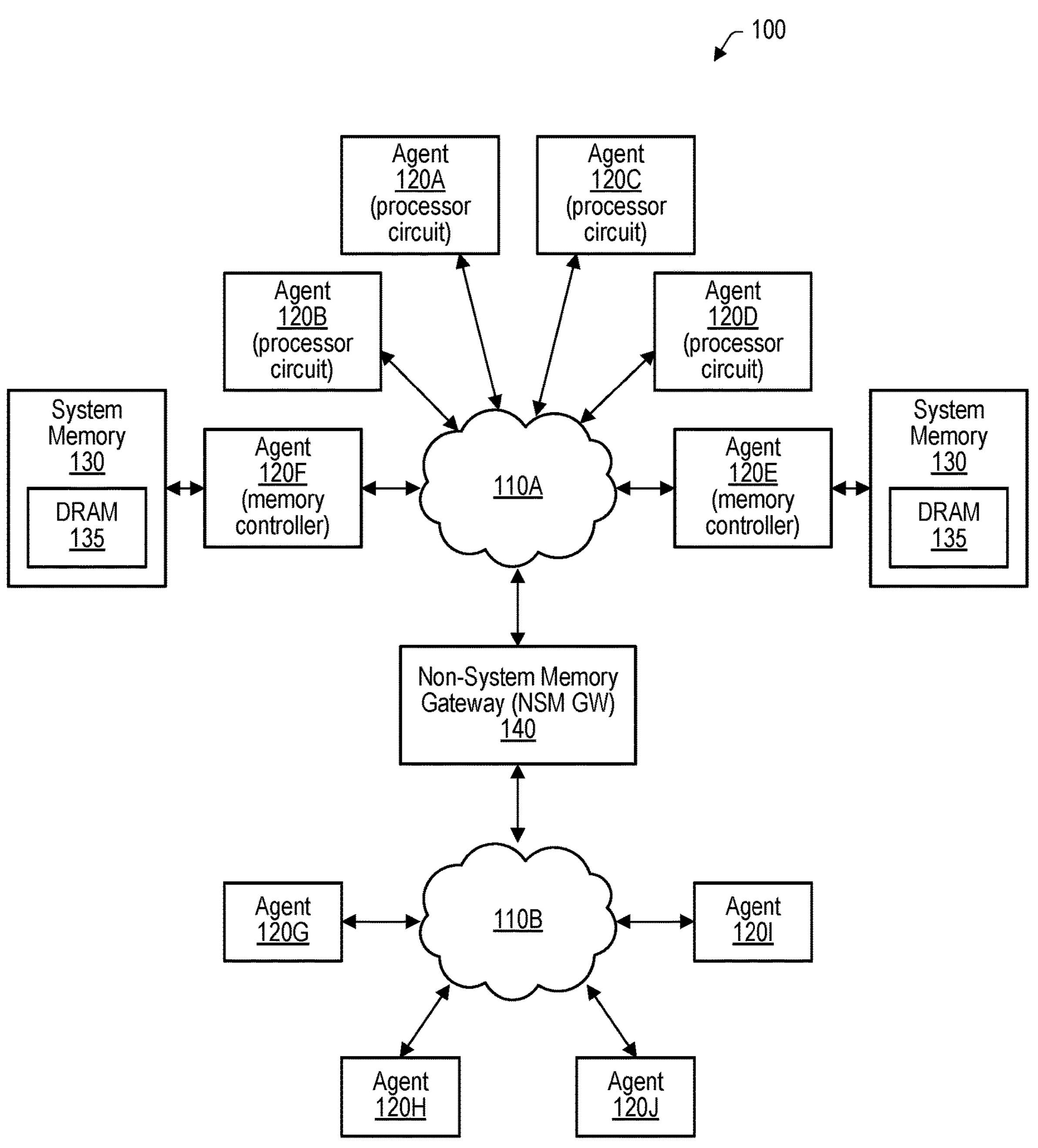
FIG. 1 is a block diagram of an SoC that includes a non-system-memory gateway (NSM GW) circuit for centralized routing of non-DRAM transactions between agent circuits.

Computer systems include one or more processors that serve as CPUs for a system, along with various other components such as memory controllers and peripheral components. The number of components that can be included in a given IC has continued to increase over time. This change in the number of processors and other discrete components on a given IC in a computer system has led to improved performance, as well as certain other benefits. For example, a given device (e.g., a mobile phone that includes an SoC) may be more compact if more of the overall system is incorporated into a lesser number of constituent ICs. Incorporating more components into fewer ICs can also lead to reduced power consumption, as well as cost savings.

On the other hand, increasing the number of processors and other components in a computer system can lead to increased complexity for communications between these components. For example, an increased number of components within an SoC leads to heightened bandwidth requirements on various networks or interconnects within the SoC, which can lead to greater latency between components. A lack of available bandwidth and an increase in latency can reduce the performance benefits that were expected to be achieved by incorporating the components into the SoC.

One type of transaction (e.g., a request and a response) within a computer system involves communication between various circuits (e.g., a processor) and a memory controller, in order to access system memory, which is made up of dynamic random-access memory (DRAM). Such a transaction is referred to herein as a "DRAM transaction." In contrast, "non-DRAM transactions" (or "non-system-memory transactions") refer to transactions between computer system components that do not result in an access to DRAM itself. (Accordingly, a write from a processor to a configuration register of a memory controller can be considered to be a non-DRAM transaction if DRAM itself is not accessed as part of the transaction.) The growing number of computer system components has led to a large number of source/destination combinations for these non-DRAM transactions. In prior implementations involving an SoC, for example, non-DRAM transactions have been handled by including sufficient routing storage (e.g., buffers and queues) and logic (e.g., an arbitration circuit) in a network interface (NI) of a given component to accommodate all possible source/destination combinations. Thus, an NI coupled to five components, each of which needs to communicate with ten distinct other components would include routing storage for each of these source/destination combinations. The amount of required routing storage within an NI would further increase when there are multiple channels for each source/destination combination.

The present inventors have recognized that the approach of including sufficient routing storage and logic in each system component for all possible types of non-DRAM transactions is a sizable contributor to NI complexity within system ICs. To address this complexity and to promote system scalability and performance, the present disclosure describes a paradigm in which the routing of non-DRAM transactions is performed centrally. Accordingly, system endpoints can send non-DRAM transactions to a non-system memory gateway (NSM GW) circuit that is configured to centrally perform various functions such as address decoding, error handling, security, thereby offloading these responsibilities from the components themselves and reducing the complexity of their corresponding NIs.

For the ease of discussion, various embodiments in this disclosure are described as being implemented using one or more SoCs. But it is to be understood any disclosed SoC can also be implemented using a chiplet-based architecture. Accordingly, wherever the term "SoC" appears in this disclosure, those references are intended to suggest alternate embodiments in which the same functionality is implemented via a less monolithic architecture, such as via multiple chiplets, which may be included in a single package in some embodiments. Accordingly, computer systems described herein can be situated on one or more co-packaged integrated circuits (ICs). In the case of a single IC, an SoC architecture may be used, while in the case on multiple ICs, a chiplet architecture may be used.

On a related note, some embodiments are described herein that include more than one computer system. Such architectures are to be understood to encompass both homogeneous designs (in which each computer system includes identical or almost identical functionality) and heterogeneous designs (in which the functionality of each computer system diverges more considerably). Such disclosure also contemplates other embodiments in which the functionality of the multiple computer systems is implemented using different levels of discreteness. For example, the functionality of a first system could be implemented on a single IC, while the functionality of a second system (which could be the same or different than the first system) could be implemented using a number of co-packaged chiplets.

The disclosure opens by providing an overview of a system that includes a non-system-memory gateway (NSM GW) circuit for centralized routing of non-DRAM transactions between agent circuits with respect to FIG. 1. Potential network connectivity of NSM GW circuits is then described with respect to FIGS. 2A-B and 3A-C, while a generic transaction flow involving the NSM GW circuit is depicted with respect to FIG. 4. One embodiment of the internal structure of the NSM GW circuit is described with respect to FIG. 5, while FIGS. 6A-E are used to illustrate various specific transaction flows that the gateway circuit facilitates. FIGS. 7A-B are associated flow diagrams for non-DRAM transactions routed by the NSM GW circuit. The specification concludes with example applications of the system described with respect to FIG. 8, and with an example computer-readable medium that stores circuit design information for implementing devices that employ the disclosed techniques described with respect to FIG. 9.

FIG. 1 is a block diagram of an SoC that illustrates this design approach. As depicted, SoC 100 includes networks 110A-B, to which are coupled various agent circuits 120. NSM GW circuit 140 is coupled to both networks 110A and 110B.

Agent circuits 120 are circuits that implement functionality for agents. As used herein, an agent is any component or device (e.g., processor, peripheral, memory controller, etc.) that sources and/or sinks communications on one or more of networks 110. A source agent circuit generates (sources) a communication, and a destination agent circuit receives (sinks) the communication. A given agent circuit 120 may be a source agent for some communications and a destination agent for other communications.

In the illustrated embodiment, network 110A is coupled to agent circuits 120A-D, which are processor circuits, and agent circuits 120E-F, which are memory controllers. As used herein, a "processor circuit" refers to any type of central processing unit (CPU). A given processor circuit can include multiple CPUs. For example, one implementation might include a single component with one processing element (i.e., one processor core). Another implementation might include a single component with multiple processor cores. Yet another implementation might include a processor cluster with multiple components, each of which may include multiple processor cores. "Memory controllers," on the other hand refer to any circuit that interfaces to system memory. Some embodiments of memory controllers may include memory caches, while others may not. Agent circuits 120A-D are able to perform DRAM transactions to access DRAMs 135 in system memory 130 using network 110A. NSM GW circuit 140 does not need to be involved in these DRAM transactions.

Network 110B is coupled to agent circuits 120G-J. In various implementations, one or more of agent circuits 120G-J coupled to network 110B are input/output (I/O) devices, a broad category that can include an internal and external display, one or more cameras (including associated image signal processor circuits), a Smart IO circuit, and interfaces to various buses such as USB and PCIe. Many other types of agent circuits 120 coupled to network 110B are possible, including a secure enclave processor, a neural processing engine, JPEG codecs, video encoding/decoding circuits, a power manager circuit, an always-on (AON) circuit, etc. The components coupled to network 110B may be referred to collectively herein as "SoC agents" to distinguish them from those components coupled to network 110A. Although not pictured in FIG. 1, network 110B may also be connected to agent circuits acting as memory controllers (e.g., 120E-F), allowing agent circuits 120G-J to perform DRAM transactions over network 110B (again, without involving NSM gateway circuit 140).

Additional networks 110 are possible within SoC 100. For example, a GPU network may couple a set of one or more GPUs to the system memory controllers, allowing the GPUs access to system memory 130. In some embodiments, the GPUs may also be connected to network 110B. In some embodiments, a computer system may have a "unified memory architecture" in which a memory controller can receive DRAM transactions from various different types of agent circuits located on different networks. For example, a memory controller might receive a DRAN transaction, from ones of the plurality of processor circuits coupled to a first network (e.g., 110A), from ones of the plurality of SoC agents coupled to a second network (e.g., 110B), and from ones of the one or more GPUs coupled to a third network (an additional network other than 110A or 110B).

A given network 110 is composed of various elements, such as network switches and various wires, buses, interconnects, etc., which can collectively be referred to as the "fabric" of that network. A given network 110 can be arranged according to any suitable network topology, including ring, mesh, star, tree, etc. Each network 110 may thus employ a topology that provides the bandwidth and latency attributes desired for that network, for example, or provides any desired attribute for the network. Thus, generally, SoC 100 may include at least a first network constructed according to a first topology and a second network constructed according to a second topology that is different from the first topology. Note that the first and second network may be packet-switched networks in some embodiments. In some cases, each network may have different operational parameters—for example, different types of network transactions (e.g., different types of snoops), different types of properties for transactions, different transaction ordering properties, etc.

Generally speaking, the ordering properties of a given network specify which communications on the network are required to remain in order. Communications for which a particular order is not required may be reordered on the network (e.g., a younger communication may complete before an older communication). For example, a "relaxed" order network used with GPUs may have reduced ordering constraints compared to CPU and I/O networks. In an embodiment, a set of virtual channels and subchannels within the virtual channels are defined for each network. For the CPU and I/O networks, communications that are between the same source and destination agent, and in the same virtual channel and subchannel, may be ordered. For the relaxed order network, communications between the same source and destination agent may be ordered if they are to the same address (at a given granularity, such as a cache block). Otherwise the communications need not be ordered. Because less strict ordering is enforced on the relaxed-order network, higher bandwidth may be achieved on average since transactions may be permitted to complete out of order if younger transactions are ready to complete before older transactions, for example. Other ordering constraints may be implemented in other embodiments. For example, the ordering requirements defined for a peripheral component interconnect (PCI) and its various versions such as PCIe may be implemented.

Given the different functionalities of networks 110, these networks can operate independently from one another. Networks 110 may be physically independent (e.g., having dedicated wires and other circuitry that form the network) and logically independent (e.g., communications sourced by agent circuits 120 in SoC 100 may be logically defined to be transmitted on a selected network 110 of the plurality of networks and thus not impacted by transmission on other networks 110). In some embodiments, network switches may be included to transmit packets on a given network. The network switches may be physically part of the network (e.g., there may be dedicated network switches for each network). In other embodiments, a network switch may be shared between physically independent networks and thus may ensure that a communication received on one of the networks remains on that network.

By providing physically and logically independent, heterogeneous networks, high bandwidth may be achieved via parallel communication on the different networks 110. Additionally, different traffic may be transmitted on different networks 110, and thus a given network 110 may be optimized for a particular type of traffic. For example, processor cores 120A-D may be sensitive to memory latency and may cache data that is expected to be coherent among the processors and memory 130. Accordingly, network 110A to which processor cores 120A-D and memory controllers 120E-F are coupled may be optimized to provide the required low latency for transactions between these components. There may be separate virtual channels for low latency requests and bulk requests, in various embodiments. The low latency requests may be favored over the bulk requests in forwarding around the network and by the memory controllers. The CPU network may also support cache coherency with messages and protocols defined to communicate coherently.

As used herein, "virtual channels" are channels that physically share a network but which are logically independent on the network. Accordingly, communications in one virtual channel between network elements do not block progress of communications on another virtual channel between the network elements. A particular virtual channel may be implemented by used routing storage dedicated to that channel.

Given the foregoing description, it is apparent that different ones of networks 110 may be heterogeneous, with different topologies, communication protocols, semantics, ordering properties, etc. Networks 110A and 110B may implement different cache coherency protocols, for example. In embodiments that include a GPU network, such a network and networks 110A-B may each include different ordering properties (e.g., different cache coherency properties such as strict or relaxed ordering), given the different function and design specifications of each network.

Although not pictured in FIG. 1, each of agent circuits 120 may include or may be coupled to a network interface circuit (NI) for coupling to one of networks 110. Such connections are described below with respect to FIGS. 2A-B and 3A-B.

Additional details about possible computer system arrangements including networks 110 can be found in the following commonly assigned applications: U.S. application Ser. No. 17/337,805 entitled "Multiple Independent On-chip Interconnect," filed on Jun. 3, 2021; and U.S. application Ser. No. 17/821,296 entitled "Scalable System on a Chip," filed on Aug. 22, 2022. Both applications are incorporated by reference herein in their entireties.

In contrast to the manner in which DRAM transactions are handled in SoC 100, non-DRAM transactions are handled centrally by NSM GW circuit 140. Thus, a transaction between agent circuit 120A and agent circuit 120G, for example, can be routed via NSM GW circuit 140, meaning that agent circuit 120A need not be directly coupled to network 110B, and agent circuit 120G need not be directly coupled to network 110A. As another example, instead of processor cores 120A-D communicating directly with one another over network 110A, non-DRAM transactions between cores 120A-D can be routed via NSM GW circuit 140. In a similar manner, non-DRAM transactions between agent circuits 120G-J can also be routed via NSM GW circuit 140. (These and other types of non-DRAM transactions are described in further detail below.)

The architecture of SoC 100 thus allows the NIs of agent circuits 120 to be greatly simplified from architectures in which each agent circuit 120 (or its corresponding NI) is responsible for maintaining dedicated routing storage for each other possible agent circuit 120 at the other end of the transaction. The introduction of NSM GW circuit 140 as a central point for non-DRAM transaction routing in the network results in a reduction of valid source/destination combinations, as well as an optimization of queues and buffers at the NIs. The use of NSM GW circuit 140 can also lead to the simplification of other system components. In certain prior implementations, some ports of the system memory controllers were used for both DRAM transactions and non-DRAM transactions, resulting in the need for multiplexer logic that was situated in the main DRAM path. The introduction of NSM GW circuit 140 into SoC 100 allows for the removal of such multiplexer logic from the memory controllers, thereby simplifying their design. Implementing processing of non-DRAM transactions at NSM GW circuit 140 has other benefits, including the centralization of address decoding, error handling, and performing security protocols.

Accordingly, a computer system is contemplated that includes NSM GW circuit coupled to at least first and second networks, and configured to route a non-DRAM transaction from a source agent circuit of a plurality of agent circuits to a destination agent circuit of the plurality of agent circuits without a first network interface of the source agent circuit using routing storage that is dedicated to the destination agent circuit, and without a second NI of the destination agent circuit using routing storage that is dedicated to the source agent circuit.

NSM GW Circuit Network Connectivity

Figure 2A:
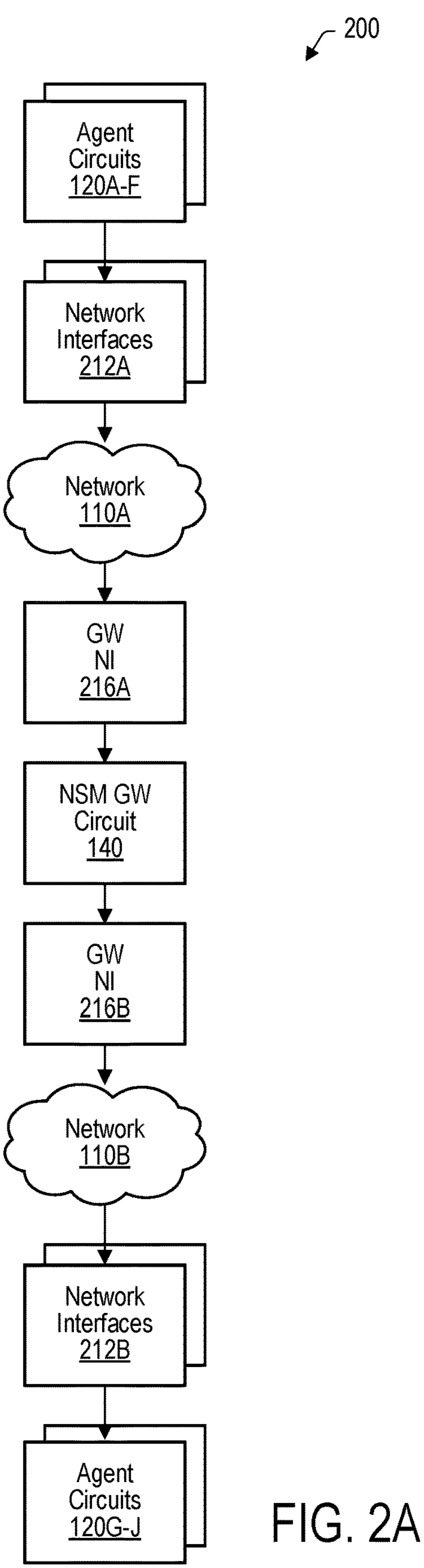
FIG. 2A is a block diagram illustrating one implementation of network interface connections within an SoC that includes a non-system-memory gateway circuit.

As previously mentioned, circuitry within SoC 100 can couple to one or more networks 110 via one or more respective network interfaces, or NIs. NIs can be included within, or couple to, the relevant circuitry. NSM GW circuit 140, in particular, can couple to networks 110A-B in various manners depending on the particular SoC implementation. FIG. 2A is a block diagram illustrating one implementation of NI connections within an SoC 200 that includes an NSM GW circuit.

As depicted, SoC 200 includes networks 110A and 110B. Various ones of agent circuits 120 such as agent circuits 120A-F are coupled to network 110A via respective ones of network interfaces 212A, while other ones of agent circuits 120 such as agent circuits 120G-J are coupled to network 110B via respective ones of network interfaces 212B. SoC 200 also includes NSM GW circuit 140, which is coupled to networks 110A and 110B via gateway NIs 216A and 216B, respectively.

Generally speaking, NIs 212 and 216 are configured to transmit and receive traffic on networks 110 on behalf of their corresponding circuits, agent circuits 120 and NSM GW circuit 140, respectively. NIs 212, for example, may be configured to convert or modify communications issued by the corresponding agent circuits 120 to conform to the protocol/format of the corresponding network 110, and to remove modifications or convert received communications to the protocol/format used by the agent circuits 120. Thus, NIs 212 may be used for agents 120 that are not specifically designed to interface to particular networks 110 directly. In some cases, an agent circuit 120 may communicate on more than one network within SoC 100. The corresponding NI may thus be configured to separate traffic issued by the agent circuit 120 to each coupled network 110, and to combine traffic received from the networks 110 for the corresponding agent 120.

Accordingly, in SoC 200, NSM GW circuit 140 is coupled to networks 110A-B via dedicated GW NIs 216A-B. In some cases, SoC 200 may be designed for a platform that is relatively high performance compared to designs for other SoC platforms. Thus, SoC 200 may correspond to a platform in which networks 110A-B have a fuller set of capabilities and performance characteristics relative to other potential SoC designs (e.g., an SoC for a desktop computer vs. an SoC for a wearable device).

Figure 2B:
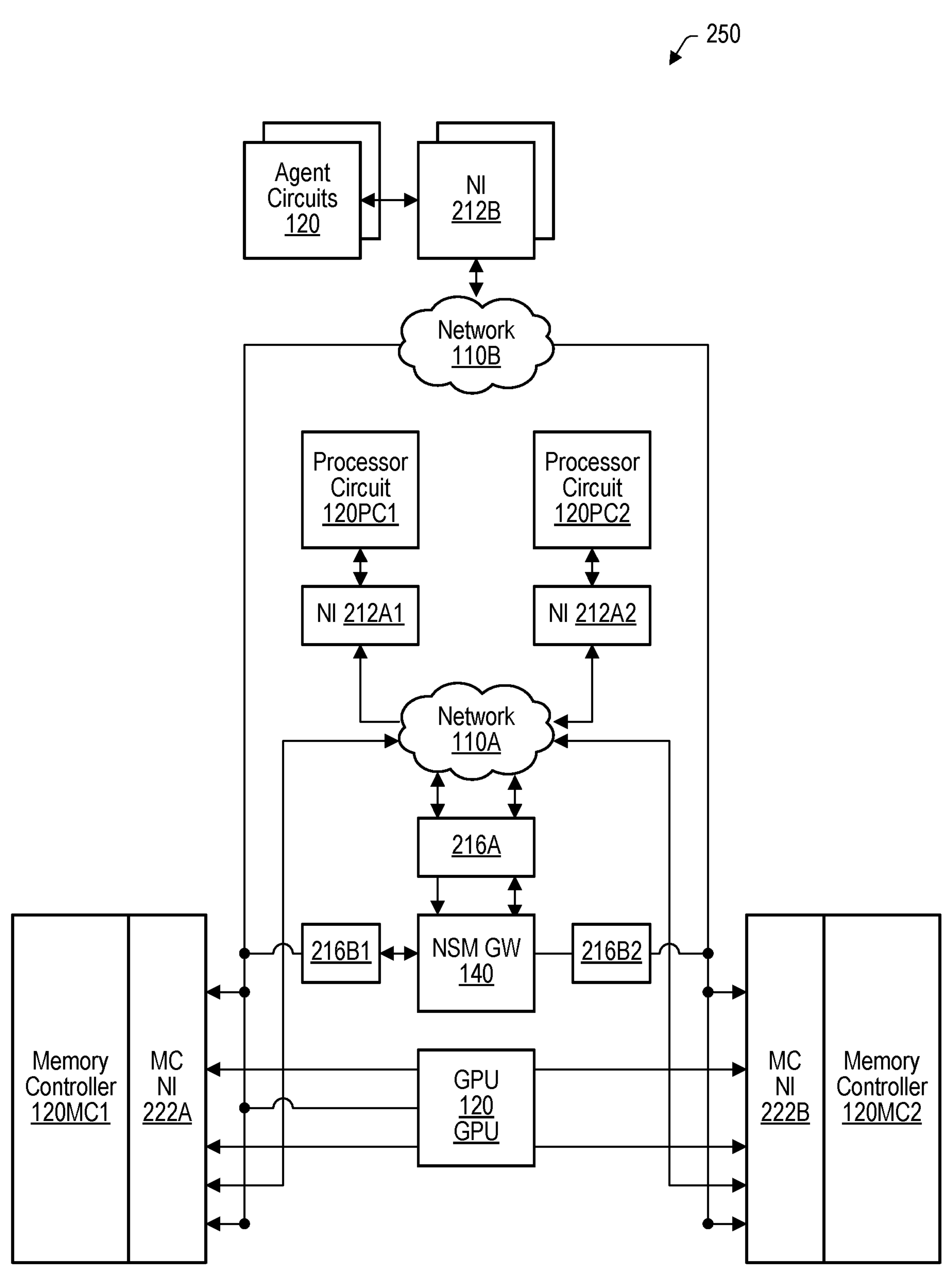
FIG. 2B is a block diagram of an SoC utilizing the network interface connectivity for a non-system memory gateway circuit such as that depicted in FIG. 2A.

FIG. 2B is a block diagram of one embodiment of an SoC implementation. As depicted, SoC 250 includes NSM GW circuit 140 coupled to networks 110A and 110B using the NI connectivity paradigm shown in FIG. 2A. SoC 250 includes a variety of other components, including agent circuits 120 and various network interfaces.

NSM GW circuit 140 is coupled to networks 110A and 110B via dedicated GW NIs 216A and 216B. (Note that while GW NI 216B is shown as two separate NIs 216B1 and 216B2, conceptually these can be thought of as a single NI.) Accordingly, non-DRAM transactions traveling to network 110B from network 110A (or vice-versa), will pass through both of NIs 216.

Network 110A in this implementation includes processor circuits 120PC and memory controllers 120MC. Processor circuits 120PC are coupled to network 110A via respective NIs 212A (e.g., 212A1, 212A2), while memory controller circuits 120MC2 are coupled to network 110A via respective memory controller NIs 222A-B. Network 110A and its corresponding fabric may thus be optimized to accommodate traffic patterns typical for computer processing elements. Although not depicted in FIG. 2B, as noted previously, memory controllers 120MC are coupled to system memory 130, which is made up of DRAM 135.

Network 110B, on the other hand, is a network that can include agent circuits 120 such as the various I/O devices and miscellaneous circuits previously discussed. These agent circuits are coupled to network 110B via one or more NIs 212B. In various implementations of SoC 250, a number of different agent circuits 120 may share a particular NI 212B. For example, a circuit that implements USB I/O functionality and a circuit that implements PCIe I/O functionality might share a particular NI 212B that is connected to network 110B. Memory controllers 120MC are also coupled to network 110B via MC NIs 222A-B. (Note that different portions of NIs 222A-B may be used to connect transactions from networks 110A and 110B to memory controllers 120MC.) Given the different types of agent circuits 120 on network 110B versus network 110A, it can be seen that the performance characteristics of network 110B may be markedly different from network 110A. For example, network 110B may not require the transmission rates and latency of network 110A.

Still further, SoC includes GPU block 120GPU, which may include one or more individual GPUs. GPU 120GPU communicates with memory controllers 120MC in this embodiment via a third, distinct network 110C (not pictured). Note that GPU block 120GPU may also be coupled to network 110B, as shown.

Figure 3A:
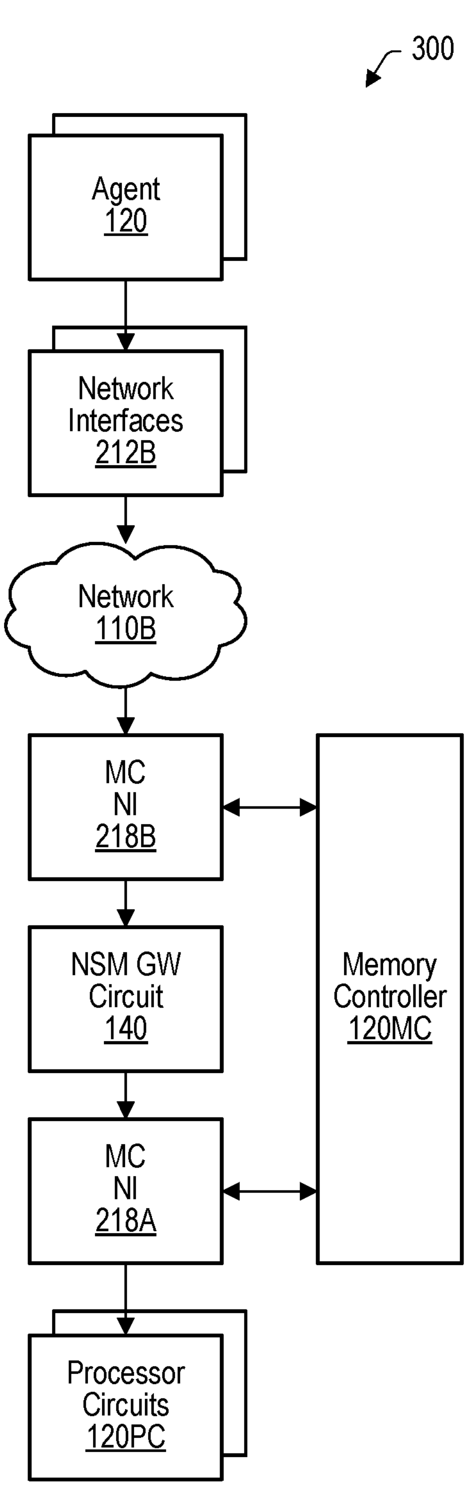
FIG. 3A is a block diagram illustrating network interface connectivity for one embodiment of an SoC with a NSM gateway circuit.

While FIG. 2B illustrates the use of specific, dedicated NIs for NSM GW circuit 140, other connectivity paradigms for that circuit are possible. FIG. 3A, for example, illustrates a block diagram of an SoC in which NSM GW circuit 140 utilizes the NI of a memory controller. This configuration may be employed, in some instances, for relatively lower-cost and lower-performance platforms within a family of SoC designs.

SoC 300 includes agent circuits 120 coupled to network 110B via one or more network interfaces 212B. The agent circuits 120 coupled to network 110B are configured to communicate with memory controller 120MC via MC NI 218B that is coupled to network 110B. As depicted, MC NI 218B is also coupled to NSM GW 140. This is accomplished by including an extra port in MC NI 218B, in addition to the other ports connected to memory controller 120MC. This approach avoids the extra cost of having specific standalone GW NIs (such as GW NIs 216A-B shown in FIG. 2A). In this manner, communication from agent circuits 120 over network 110B can either be routed to memory controller 120MC or NSM GW 140 by a single circuit, MC NI 218B.

Similarly, processor circuits 120PC are configured to communicate with memory controller 120MC over MC NI 218A. MC NI 218A is also coupled to NSM GW 140 in a manner similar to MC NI 218B. Communications from processor circuits 120PC can thus be routed either to memory controller 120MC or NSM GW 140 by a single circuit, MC NI 218A.

Figure 3B:
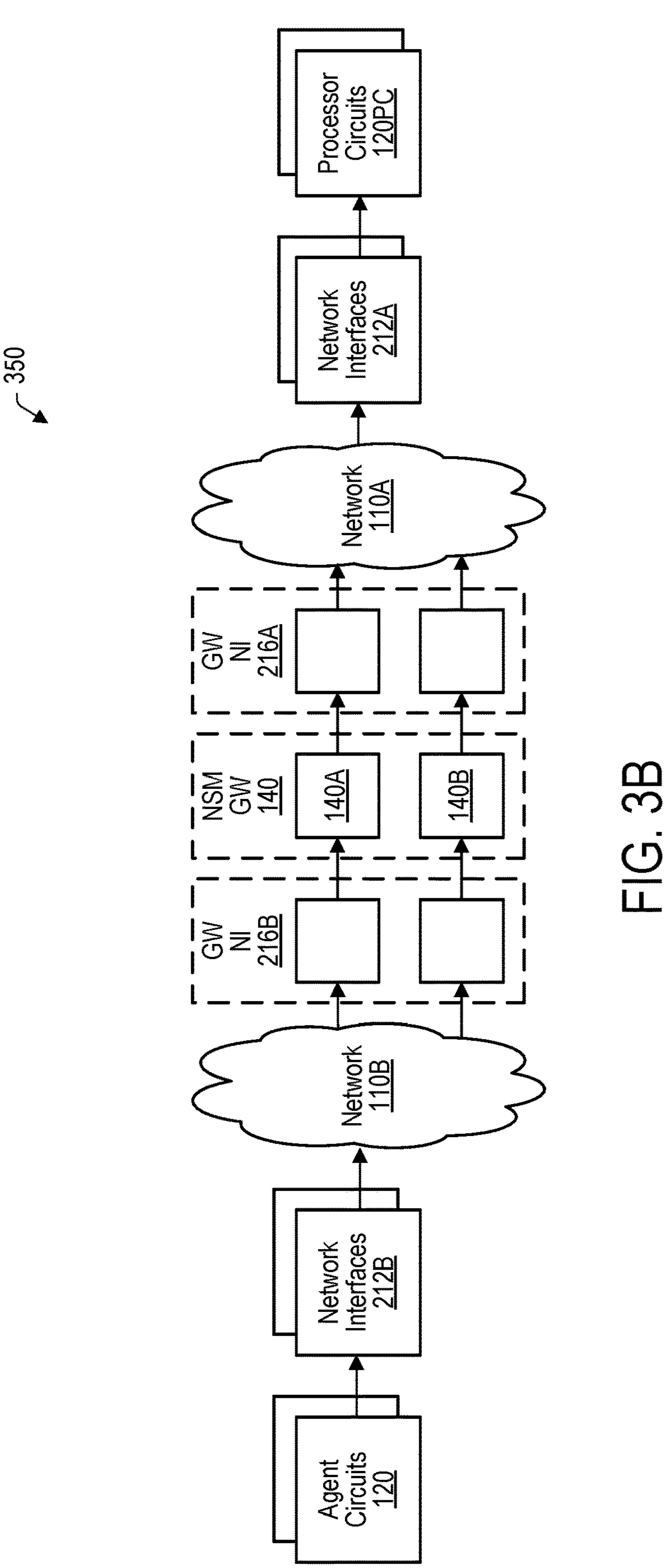
FIG. 3B is a block diagram illustrating network interface connectivity for one embodiment of an SoC with multiple NSM gateway circuits.

While the architecture depicted in FIG. 3A may correspond to a system with relatively lower performance, FIG. 3B is a block diagram of one embodiment of a connectivity architecture in an SoC system with relatively higher performance. Such a platform may, for example, have a greater number of certain agent circuits 120, such as additional processor circuits and memory controllers. As illustrated, such systems may have multiple instances of NSM gateway circuits to promote system scalability.

SoC 350 includes, in a manner similar to other previously described embodiments, networks 110A and 110B. Various agent circuits 120 are coupled to network 110B via one or more NIs 212B. Similarly, multiple processor circuits 120 (a specific type of agent circuit 120) are coupled to network 110A via respective network interfaces 212A. For the purpose of simplicity, memory controllers within SoC 350 are not depicted.

SoC 350 also includes an NSM GW circuit 140, as indicated by a dashed line. But this implementation of circuit 140 includes two gateway sub-circuits (denoted as 140A and 140B), each instance of which is coupled to both networks 110A and 110B. NSM GW sub-circuits 140A and 140B are each coupled to networks 110A-B via respective portions of GW NIs 216A-B (or distinct GW NIs). In one implementation, sub-circuits 140A and 140B are identical (or nearly identical) versions of the same sub-circuit, each having the same functionality. In other implementations, the functionality of sub-circuits 140A-B may diverge more considerably. Note that additional sub-circuits (140C, 140D, etc.) may be included in an SoC in other embodiments, in order to scale the system's capability as desired.

In one implementation, each sub-circuit 140A, etc. is associated with some particular set of agent circuits. Consider an implementation in which SoC 350 includes three processor circuits (PC0-PC2), four memory controllers (MC0-3), and 8 NIs coupled to network 110B (NI0-7 where each such NI can couple to multiple endpoint agent circuits 120). NSM GW circuit 140A may be configured such that NSM GW sub-circuit 140A handles non-DRAM transactions sourced by PC0, MC0, MC2, and agent circuits coupled to NIs 0, 1, 2, and 7. NSM GW sub-circuit 140B, on the other hand, would handle non-DRAM transactions sourced by PC1, PC2, MC1, MC3, and agent circuits coupled to NIs 3-6.

According to this division of labor, sub-circuits 140A-B can operate independently with respect to handling non-DRAM transactions. The flow of non-DRAM transactions is described more fully below, but when multiple NSM GW sub-circuits are present in an SoC, the NI for the source agent circuits routes the request to the NSW GW circuit instance associated with the source agent circuit (this association is typically hardwired into the system). That NSM GW circuit instance will route the request to a destination specified in the request. In some embodiments, request and response messages of the same transaction are routed to the same NSM GW circuit instance. Accordingly, a response message will be routed by the NI associated with the destination agent to the NSM GW circuit instance that handled the request. That instance will forward the response message back to the original requestor according to a destination specified in the response message.

Figure 3C:
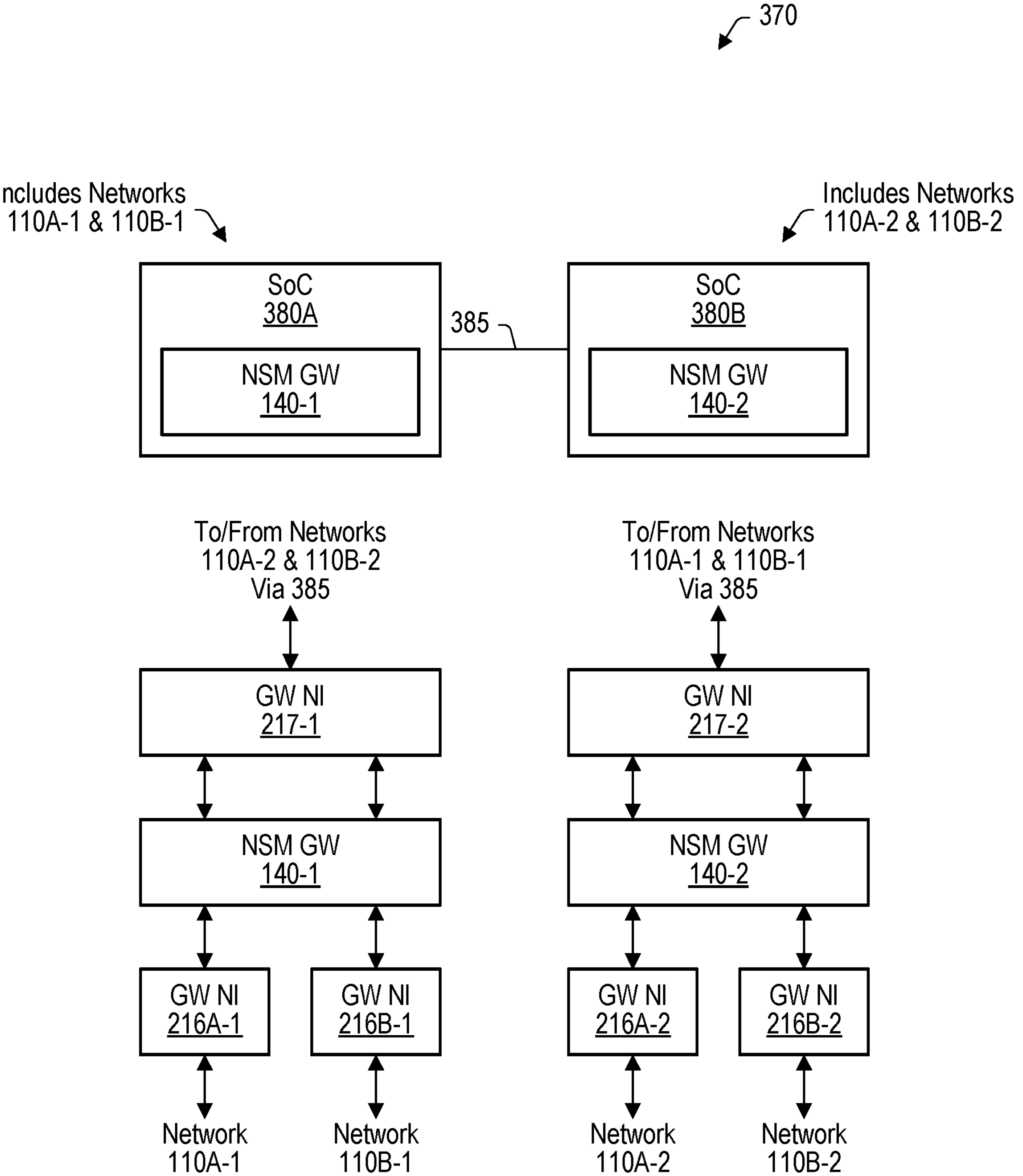
FIG. 3C is a block diagram illustrating network interface connectivity for one embodiment of a system with multiple SoCs, each having a NSM gateway circuit.

In addition to support for scaling of functionality on a single SoC by virtue of including multiple NSM GW circuit instances on a given SoC, support for scaling of functionality across multiple SoCs formed on respective ICs is also contemplated. FIG. 3C is a block diagram of such an embodiment. As depicted, system 370 includes two SoCs (380A and 380B) coupled via interconnect 385. SoC 380A includes NSM GW circuit 140-1, network 110A-1 (an instance of network 110A described previously), and network 110B-1 (an instance of network 110B described previously). SoC 380B, on the other hand, includes NSM GW circuit 140-2, network 110A-2 (an instance of network 110A), and network 110B-2 (an instance of network 110B).

Whereas NSM GW circuit 140 as described in other embodiments included connections to networks 110A and 110B on the same IC, depicted NSM GW circuits 140-1 and 140-2 include additional connections that make inter-die communication for non-DRAM transactions possible. Thus, in addition to having connections to networks 110A-1 and 110B-1 on SoC 380A via GW NIs 216A-1 and 216B-1, NSM GW circuit 140-1 also couples to GW NI connection 217-1 and interconnect 385, allowing communication with agent circuits 120 on SoC 380B via networks 110A-2 and 110B-2 and associated NIs. Similarly, NSM GW circuit 140-2 is coupled to GW NIs 216A-2, 216B-2, and 217-2, the latter allowing communication with agent circuits 120 on SoC 380A via networks 110A-1 and 110B-1 and associated NIs.

Although two SoCs formed on two integrated circuits are depicted, in other embodiments, systems with a greater number of SoCs are possible. Additionally, one or more of the multiple possible SoCs can have multiple instances of NSM GW circuit 140 in some embodiments.

Preventing Deadlock Via Credit Schemes

The SoC designs described herein include multiple networks, each having switches and other hardware (generically, "switch elements") that connect source agent circuits and destination agent circuits. Each of those switch elements has some finite amount of storage, and can potentially receive data (e.g., a packet) from multiple different sources (and/or need to route the data to different destinations). It is desirable for networks to be designed to prevent deadlock, such as might occur in the case of "head of line blocking," when a packet at top of a queue cannot be routed due to lack of storage at the next hop or higher-level dependencies.

One mechanism to prevent deadlock is the use of a credit scheme. This scheme requires a source agent circuit, before it issues a packet on the network, to have a "credit" (or "network credit") that was provided by the destination of that packet (which equates to a buffer location in which the packet can be stored). A credit, as used herein, is a type of received indication from another entity in the system that represents the ability to send network traffic. A credit can be specified, for example, in a message received over a network 110, and may be stored in a structure that can be referred to as a credit buffer. When a source is issued a credit from a destination, a corresponding packet is guaranteed to be able to move into the destination because there is a buffer location for that packet. Every packet, whenever it has an opportunity to exit the network at its destination, has a buffer location and therefore does not block up the switches indefinitely. Transmission from source to destination may also involve the use of other, intermediate credit schemes. Note that a "packet" is a communication from a source to a destination. Thus, in the context of the present disclosure, a packet might represent a non-DRAM transaction such as a communication from a processor circuit to an I/O agent circuit, etc.

At initialization, each destination may transmit one or more credits to each source that can communicate with it. The total number of credits that the destination can send out over all its sources is limited to the total number of buffer locations that it has. When the source wants to send a packet, it checks its credit count for the destination of the packet. If the source's credit count for the destination is zero, the source will wait to send the packet. If the credit count is non-zero, the source consumes a credit (deducts it from its credit count for the destination) and sends the packet. When the packet arrives at the destination, the destination stores it in a buffer location (which is guaranteed to be available because the credit represents a location in the buffer, although not necessarily a specific buffer location). Once the destination removes the packet from the buffer, freeing the location, it transmits the credit back to the source. The source adds the credit to its credit count and can use it to send another packet.

There are various possible nuances to credit schemes. For example, the mechanism for returning credits may vary. Sometimes the credits can be piggybacked on other packets going to the source, but usually a dedicated credit return packet is employed. Aggregated credits might be returned at the same time, usually with a timeout so that credits do not accumulate for too long. In the case of virtual channels, credits can be allocated per source and per virtual channel, thereby keeping independence between the channels. In some cases, packets may have different sizes, and thus credits equaling a certain number of bytes might be used, with the condition that a source needs enough credits to at least equal the number of bytes in the packet. There might also be separate command and data credits, which may require having both types of credits if a packet being sent includes both command and data portions. While the schemes may vary, for a given system, the scheme is typically set a priori using fuses, non-volatile memory, etc.

Generic Non-DRAM Transaction Flow

FIG. 4 illustrates a generic flow 400 of a request message from a source (labeled as source agent circuit 120S) routed over network 110S to NSM gateway circuit 140 and then forwarded over network 110D to a destination (labeled as destination agent circuit 120D). The path of the request message is described by referring to reference numerals 401-410. Note that network 110S and 110D may be the same or different networks-accordingly, in some transactions, networks 110S and 110D may both be network 110A, while in other transactions, networks 110S and 110D are networks 110A and 110B, respectively. The response message follows the same path as the corresponding request message, but in the opposite direction, and is described by referring to reference numerals 411-420. Broadly speaking, there are four end-to-end (E2E) segments in this flow: 1) request message from source agent circuit 120S to NSM GW circuit 140; 2) forwarded request message from NSM GW circuit 140 to destination agent circuit 120D; 3) response message from destination agent circuit 120D to NSM GW circuit 140; and 4) forwarded response message from NSM GW circuit 140 to source agent circuit 120S.

Request Message

Flow 400 begins at 401, in which source agent circuit 120S issues a request message to its associated network interface 460S, which may be performed on a virtual channel in some embodiments. This virtual channel may be dedicated to non-DRAM transaction requests in some implementations. Prior to 401, source agent circuit 120S has been issued a credit by GW NI 460G. At 402, NI 460S sets the routing vector of the request message directed to its associated NSM GW circuit and forwards the request to network 110S. In the depicted example, there is only one gateway circuit (denoted by reference numeral 140), but recall that a given SoC may have more than one gateway circuit in some cases.

At 403, the request message arrives at a credit buffer in GW NI 460G. Then, at 404, GW NI 460G arbitrates to determine which of all possible request messages from all current non-DRAM transaction sources should be handled next. The winning message is then forwarded to NSM GW circuit 140. GW NI 460G then sends the corresponding credit back to source agent circuit 120S, allowing further request messages to be sent. In one embodiment, a separate pool of credits is maintained by GW NI 460G for communications between GW NI 460G and NSM GW circuit 140. At 405, the request message is stored in an input buffer (not pictured), which may be organized by source in some embodiments.

At this point, in some embodiments, the request message is complete from the perspective of the source agent circuit—NSM GW circuit 140 now takes over to forward the request message to the destination. Accordingly, NSM GW circuit 140 acts as a "termination point" for the request message, meaning that network credit is returned to source agent circuit 120S prior to the request message being received by destination agent circuit 120D—in this particular example, upon receipt of the request message by GW NI 460G. In other words, although a destination other than NSM GW circuit 140 may be specified in a request message (e.g., an agent circuit on network 110B), from the standpoint of the source agent circuit, the use of this paradigm allows source agent circuit 120S to initiate other transactions without waiting for the actual delivery of the request message to destination agent circuit 120D. Notably, this paradigm means that an NI of source agent circuit 120S does not require dedicated routing storage (e.g., a buffer) for all possible non-DRAM destinations such as destination agent circuit 120D. An NI of a source agent such as source agent circuit 120S may instead have routing storage for NSM GW circuit 140, which in turn has routing storage for all possible destinations. This approach can lead to a reduced footprint for routing storage across a computer system such as SoC 100.

Forwarded Request Message

At 406, NSM GW circuit 140 routes the request message to one of its output queues according to a set of routing rules. In some embodiments, circuit 140 maintains a queue per destination, per network (a possible internal structure of circuit 140 is discussed in further detail below with respect to FIG. 5). At 407, NSM GW circuit 140 arbitrates across eligible destination queues and forwards the winning request message to the GW NI connected to destination network 110D (here, GW NI 460G2, which may be the same as GW NI 460G1 in some cases). Again, credits may be maintained between circuit 140 and GW NI 460G2, per destination.

At 408, GW NI 460G2 sets a routing vector of the request message directed to indicate destination agent circuit 120D, and then sends the message into network 110D. At 409, the request message arrives at a credit buffer of NI 460D, which is associated with the destination agent circuit 120D. At 410, NI 460D then arbitrates between request messages from all sources and forwards the winning message to the destination agent circuit, and sends the corresponding credit back to the GW NI 460G2.

Response Message

After destination agent circuit 120D processes the request message, it issues at 411 a response message to NI 460D. In one embodiment, the response message is issued on a virtual channel that is dedicated to response messages. At 412, NI 460D sets the routing vector of the response message directed to the NSM GW circuit associated with the destination value identified in the message. After the response message arrives at the credit buffer in NI 460G2 at 413, GW NI 460G2 arbitrates between messages from all sources at 414 and forwards the winning message to NSM GW circuit 140. GW NI 460G2 then sends the corresponding credit back to destination agent circuit 120D. Again, a separate pool of credits may be maintained from GW NI 460G2 to NSM GW circuit 140 per source. Finally, the response message is stored in a response ingress buffer within circuit 140; this buffer may be organized by source.

Forwarded Response Message

At 416, NSM GW circuit 140 routes the response message to one of its output queues according to a destination id value specified in the message. Similar to the request message handling, NSM GW circuit 140 may maintain a queue per destination, per network. Next, NSM GW circuit 140 arbitrates across eligible destination queues at 417, and forwards the winning response message to the GW NI 460G1. Then, at 418, GW NI 460G1 sets the routing vector of the response message to the NI of the source agent circuit 120S, and then sends the message into network 110S. At 419, the response message arrives at a credit buffer of NI 460S. Finally, NI 460S arbitrates between response messages from all sources, forwards the winning message to the original requestor agent, and then sends the corresponding credit back to the GW NI 460G2.

Structure of NSM GW Circuit

Figure 5:
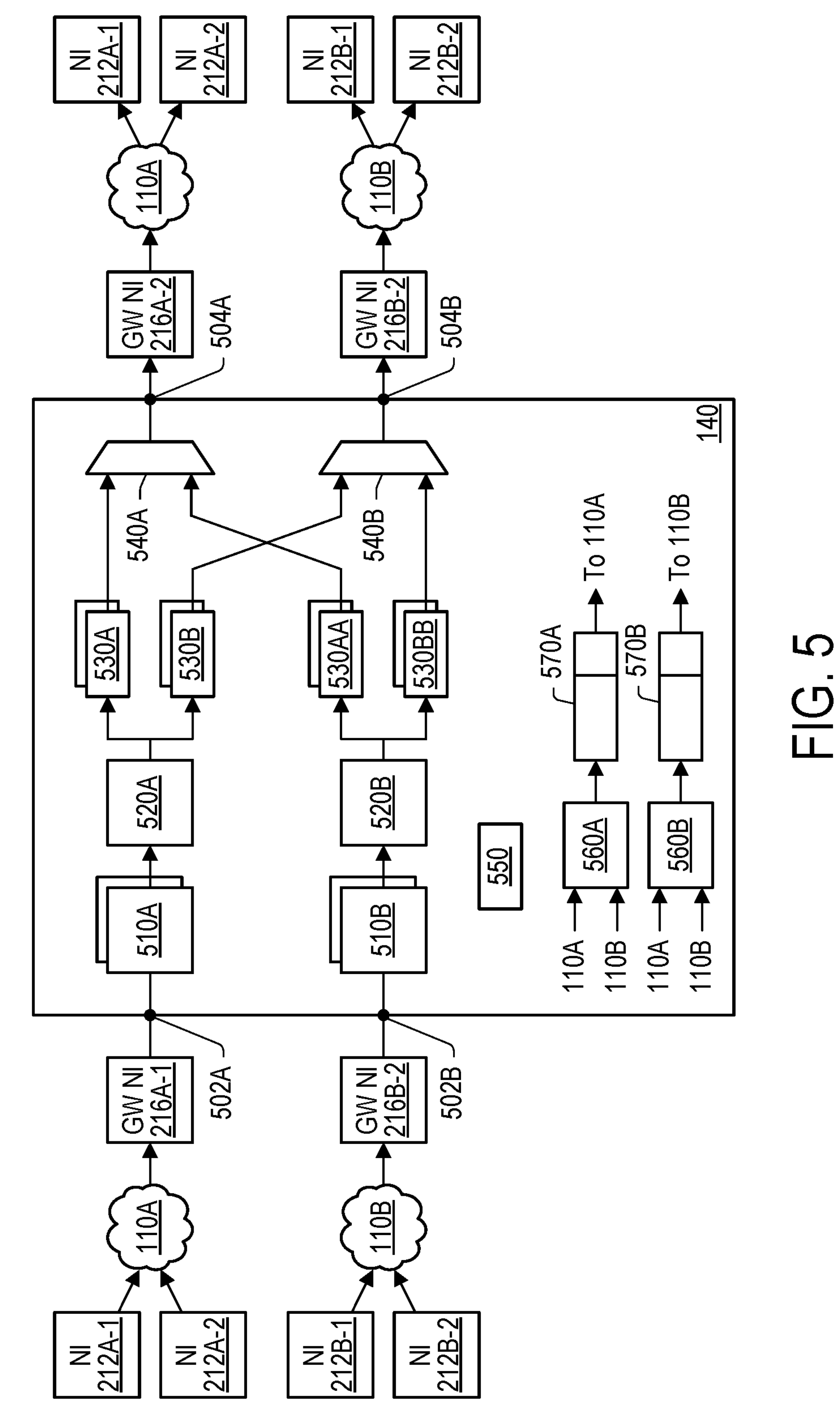
FIG. 5 is a block diagram illustrating one embodiment of a path for a request message for a non-DRAM transaction, including a potential internal structure for a centralized gateway circuit.

FIG. 5 is a block diagram illustrating one embodiment of a path for a request message for a non-DRAM transaction through an SoC 500, including a potential internal structure for NSM GW circuit 140. A path for a response message (not pictured) would be similar. Depicted high-level elements of SoC 500 include source NIs 212, networks 110A-B, GW NIs 216, and NSM GW circuit 140.

SoC 500 includes various agent circuits 120, which communicate with networks 110A-B via NIs 212A and 212B, respectively. An NI 212 for a given source agent circuit maintains a transaction (TX) queue for transfers to NSM GW circuit 140. These transfers occur over one of networks 110, arriving at one of GW NIs 216. For example, source NI 212A-1 can send a message over network 110A to GW NI 216A-1, which maintains a queue for each potential message source on network 110A. GW NI 216A-1 is then operable to transmit a message from its source queue to one of ingress buffers 510A within circuit 140 via input port 502A. In this embodiment, ingress buffers 510A include one ingress buffer per possible source on network 110A. Similarly, a message over network 110B arrives at GW NI 216B-1, which maintains a queue for each message source on that network and is operable to forward a message from one of the queues via input port 502B to one of ingress buffers 510B. Buffers 510B are also maintained for each source on network 110B.

NSM GW circuit 140 also includes output port 504A, which is coupled to GW NI 216A-2, which maintains received messages destined for circuits on network 110A in a set of queues (not pictured), one queue per possible destination. GW NI 216A-2 is operable to select a message from one of its queues and forward it over network 110A to NIs 212A that are coupled to various destination agent circuits 120. Similarly, NSM GW circuit 140 also includes output port 504B, which is coupled to GW NI 216B-2, which maintains received messages destined for sources on network 110B in a different set of queues (also not pictured), one queue per possible destination. GW NI 216B-2 is operable to select a message from one of its queues and forward it over network 110B to NIs 212B that are coupled to various destination agent circuits 120.

Between input ports 502 and output ports 504, NSM GW circuit 140 maintains queues 530, one per destination, per network. Accordingly, queues 530A store messages from sources on network 110A that have destinations on network 110A. (Thus a queue 530A-1 might store messages for destination 1 on network 110A, queue 530A-2 might store messages for destination 2 on network 110A, etc.) Similarly, queues 530B store messages from sources on network 110A that have destinations on network 110B. Queues 530AA and 530BB, meanwhile, store messages from sources on network 110B that have destinations on networks 110A and 110B, respectively. In one implementation, queues 530 are implemented as linked lists pointing to messages stored in input buffers 510.

In one embodiment, address decoding and routing circuits 520 determine the destination of a message and the corresponding queue 530. This action may be performed by applying a set of routing rules (which may be specified in a system address map or routing table) to each message received in input buffers 510. In this manner, NSM GW circuit 140 can centrally perform decoding and routing on non-DRAM transactions. This approach has a number of benefits, including improved security. For example, in some embodiments, the system address map may be set to have a reduced set of possible mappings during certain time periods. Thus, during a system boot sequence, the system address map may have a limited set of mappings which can then be increased to a more expansive set of mappings after the system boot sequence finishes. As one example of prohibited transaction that may be prohibited at a particular time, consider a computer system that is formed on a first of a plurality of integrated circuit (IC) dies, and wherein the limited set of mappings do not permit a non-DRAM transaction with a destination agent circuit located within a second computer system formed on a second of the plurality of IC dies. In some embodiments, the routing table may be set after circuitry within the computer system communicates (e.g., by performing a handshake protocol) with a system control circuit to determine which sources and destinations for non-DRAM transactions are currently permitted, and to update the routing table accordingly.

As shown, each output port 504 has an egress arbitration circuit 540 that is configured to select candidate messages stored in queues 530 for transmission on a corresponding network (one message per cycle, in one embodiment). Egress arbitration circuit 540A is coupled to queues 530A and 530AA, for example, which store messages destined for network 110A from sources on networks 110A and 110B, respectively. Conversely, egress arbitration circuit 540B is coupled to queues 530B and 530BB, which stores messages destined for network 110B from sources on networks 110A and 110B, respectively.

NSM GW circuit 140 may facilitate functionality other than forwarding messages between agent circuits 120. For example, NSM GW circuit 140 supports agent circuits writing to configuration registers of circuit 140, as well as to components of networks 110 (e.g., networks switches). NSM GW circuit 140, in one embodiment, includes local registers 550 and 560 for supporting this additional functionality. For example, writing to local registers 550 can be used to access the configuration of circuit 140 itself.

Similarly, writing to local registers 560A-B can be used to write to network components (on networks 110A and 110B respectively). In one embodiment, a system address map can be used to identify those request messages that are directed to network components. In one embodiment, circuit 140 supports only a single outstanding transaction directed to network components, thereby avoiding the need for corresponding credits and buffers. In addition to the other egress queues per destination, NSM GW circuit 140 maintains dedicated output queues for each network, 570A (for components of network 110A) and 570B (for components of network 110B). The targeted network component sends the corresponding response message back to NSM GW circuit 140, which is responsible for forwarding the message back to the original requestor agent circuit. This process is described in further detail with respect to FIG. 6D.

In certain embodiments of platforms with multiple instances of circuit 140 per integrated circuit, only a single instance of circuit 140 will implement local registers 550 and 560. If that instance is circuit 140A, for example, requestor agent circuits 120 associated with instance 140A will send network component requests to that instance as they would with any other request; requestor agent circuits 120 associated with another instance (e.g., 140B), on the other hand, will still send requests to instance 140B, which will then forward the transaction to instance 140A for further processing.

In some embodiments, NSM GW circuit 140 does not maintain any state or memory related to regular messages, but does maintain a context and state for transactions directed to network components. This context and state will be maintained until the transaction with the network component is complete and the corresponding response message is sent back to the original requestor agent.

SoC 500 may utilize various methods for preventing deadlock, including different types of credits. For example, a point-to-point (P2P) credit scheme may be utilized between each agent circuit 120 and its corresponding NI 212. P2P credits may also be maintained for each source between GW NIs 216 and NSM GW circuit 140 on the input path, and for each destination between NSM GW circuit 140 and GW NIs 216 on the output path. Between NIs 212 and GW NIs 216, an end-to-end (E2E) credit scheme may be used. The motivation for maintaining P2P credits per source on the ingress, P2P credits per destination on the egress, and separate queues per destination is to avoid potential blocking conditions across different sources and destinations of non-DRAM transactions. If a specific destination is blocked, transactions directed to other destinations will continue flowing. If a specific source is eventually blocked by a particular destination, transactions from other sources to other destinations will continue flowing. Transaction flows between two instances of circuit 140 may also be architected to avoid cyclic dependencies, such as by ensuring that transactions can be forwarded only from one specific NSW GW circuit instance 140 (e.g., from instance 140A to 140B, but not from instance 140B to instance 140A).

Types of Non-DRAM Transactions

The disclosed paradigm permits all communication between non-DRAM transaction initiators (or sources or origins) and targets (or destinations) to be performed centrally through NSM GW circuit 140 if desired, allowing significant reduction in source-target combinations for end-to-end flow control and associated buffering resources. In some system implementations, non-DRAM transaction flows never bypass NSM GW circuit 140 by using direct routing from source to target. In other system implementations, some non-DRAM transaction types may be selected to be implemented without routing through NSM GW circuit 140. A description of an SoC system herein as having "centralized" routing is thus not intended to mean that all non-DRAM transactions must necessarily be performed using NSM GW circuit 140. But the use of circuit 140 does mean that all non-DRAM transactions can be routed through this circuit if desired.

In various embodiments, NSM GW circuit 140 supports all possible combinations of source and target agents of any network to which it is coupled (e.g., networks 110A-B). Non-DRAM transactions may be initiated by agent circuits 120 coupled to network 110A (processing circuits) via NIs 212A or by SoC agent circuits 120 coupled to network 110B via NIs 212B. Targets of non-DRAM transactions can include agent circuits 120 coupled to network 110A (e.g., transactions setting processor circuit configuration registers), SoC agent circuits 120 (e.g., PCIe/ATC PIO, SouthBridge, configuration registers of various devices), memory controllers (e.g., transactions targeting configuration registers). Possible non-DRAM transaction flows that can be routed via NSM GW circuit 140 in various embodiments are summarized in Table 1 below.

TABLE 1

| Initiator | Non-DRAM Transaction Flow |
|---|---|
| Processing Circuit (PC) | PC to SoC Agent<br>PC to different PC<br>PC to same PC<br>PC to Memory Controller<br>PC to NSM GW<br>PC to Network Component |
| SoC Agent | SoC agent to SoC agent<br>SoC agent to PC<br>SoC agent to Memory Controller<br>SoC agent to NSM GW<br>SoC agent to Network Component |

In various embodiments, after receiving a request message from a source on a virtual channel that begins a transaction flow, NSM GW circuit 140 (or an instance of circuit 140 associated with the source) first determines the target destination of the request message based on the system address map. Then, circuit 140 sets the source id and destination id of the forwarded message according to the source id of the original request message and the determined target destination respectively, and forwards the request message to the target destination.

Response messages may be received at NSM GW circuit 140 (or the same instance of circuit 140 that handled the request) on a different virtual channel. Circuit 140 determines the destination of the response message from the destination id field, and sets the source id and destination id of the forwarded response message to be the same source and destination ids of the received response message. Finally, NSM GW circuit 140 forwards the response message to the original requestor agent.

Particular non-DRAM transactions flows are now described in more detail with respect to FIGS. 6A-E.

Processor Circuit-to-Processor Circuit Flow

Figure 6A:
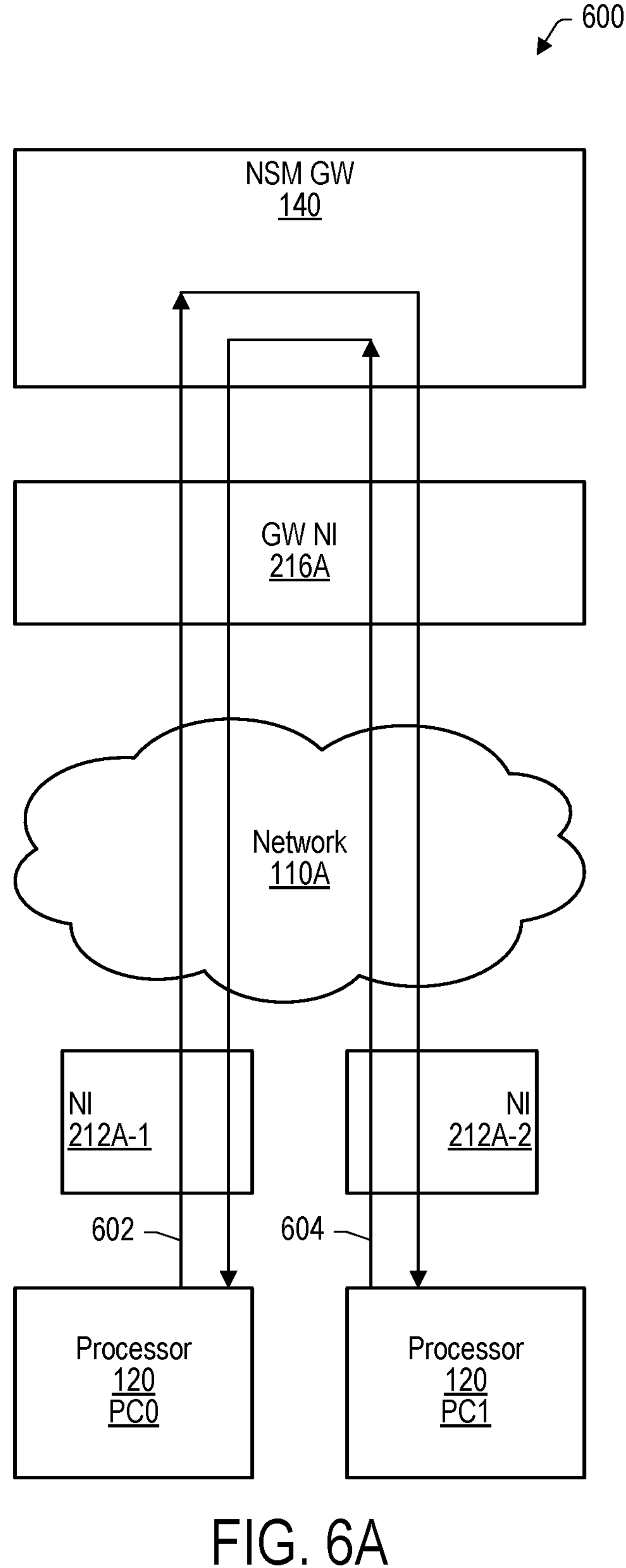
FIG. 6A is a block diagram illustrating a flow for a processor circuit-to-processor circuit non-DRAM transaction through a centralized gateway circuit.

FIG. 6A is a block diagram that illustrates the flow of one embodiment of a processor circuit-to-processor circuit non-DRAM transaction. SoC elements depicted include NSM GW circuit 140, GW NI 216A, network 110A, and processor circuits 120PC0-1, coupled to network 110A via respective NIs 212A-1 and 212A-2. Transaction 600 includes a request message 602 and a response message 604.

Transaction 600 begins with agent circuit 120PC0 sending request message 602 to GW NI 216A via NI 212A-1 and network 110A. In one embodiment, GW NI 216A enqueues the request in an incoming E2E buffer specific to the source and destination, and then reserves credit for an outgoing P2P queue to NSM GW circuit 140 based on the source. Arbitration with commands from other sources then takes place. Upon successful arbitration, GW NI 216A forwards the request to NSM GW circuit 140.

Within circuit 140, request message 602 goes through address decode logic, which determines that the request's target is processor circuit 120PC1. Response message 604 is then enqueued in an outgoing queue for network 110A that is dedicated to processor circuit 120PC1. Request message 602 receives an outgoing P2P credit based on the destination (processor circuit 120PC1) and arbitrates with other commands going to network 110A. Upon successful arbitration, reflected request message 602 is forwarded to GW NI 216A over the TX interface and travels over network 110A to processor circuit 120PC1.

After receipt of request message 602, processor circuit 120PC1 generates response message 604, which is routed back to NSM GW circuit 140. To this end, response message 604 is received at GW NI 216A and enqueued in an incoming E2E buffer. Credit for an outgoing P2P queue to NSM GW circuit 140 is reserved based on the source (120PC1) of response message 604. Arbitration occurs for response message 604 along with commands from other sources. Upon successful arbitration, GW NI 216A forwards response message 604 to NSM GW circuit 140. In one implementation, response message 604 bypasses address decode logic and is enqueued in an outgoing queue to network 110A according to request's initiator, also the destination of response message 604 (120PC0). Response message 604 then reserves outgoing P2P credit to GW NI 216A for the destination, 120PC0. Arbitration occurs with other commands going to network 110A. Upon successful arbitration, response message 604 is forwarded to GW NI 216A over the TX interface; message 604 then travels over network 110A back to the transaction's initiator (120PC0).

Processor Circuit-to-SoC Agent Flow

Figure 6B:
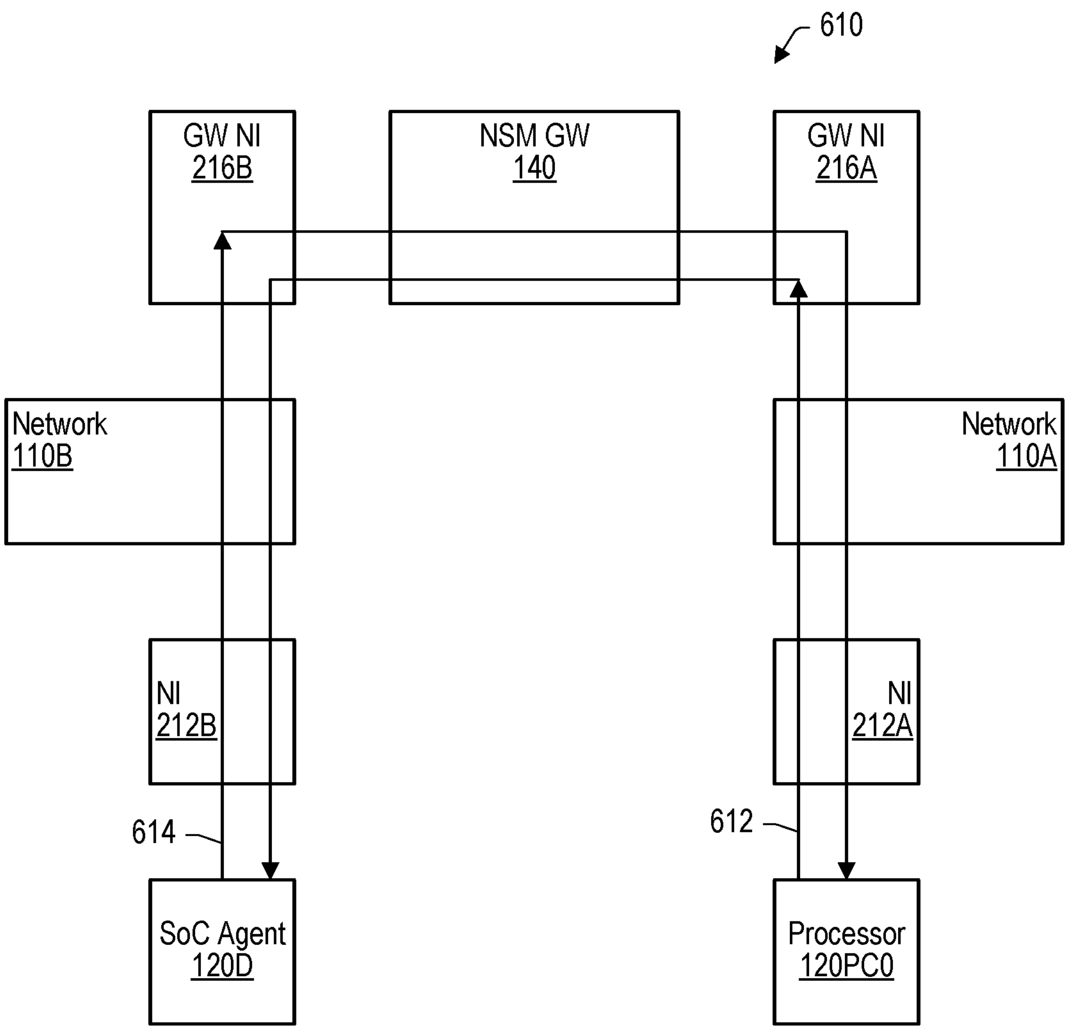
FIG. 6B is a block diagram illustrating a flow for a processor circuit-to-SoC agent non-DRAM transaction through a centralized gateway circuit.

FIG. 6B is a block diagram that illustrates the flow of one example of a processor circuit-to-SoC agent non-DRAM transaction. Elements depicted include NSM GW circuit 140, GW NIs 216A-B, networks 110A-B, and processor circuit 120PC0 (coupled to network 110A via NI 212A) and SoC agent 120D (coupled to network 110B via NI 212B). Transaction 610 includes a request message 612 and a response message 614.

Transaction 610 begins with processor circuit 120PC0 sending request message 612 to GW NI 216A via NI 212A and network 110A. GW NI 216A enqueues the request in an incoming E2E buffer specific to the source and destination, reserves P2P credit for the GW queue based on the request source, and arbitrates with commands from other sources. When arbitration is successful, GW NI 216A forwards the request to NSM GW circuit 140. Request message 612 goes through address decode logic, determining that request's target is a SoC agent located behind an NI 212B on network 110B. The request is enqueued in an outgoing queue to network 110B according to its decoded target. The reflected request reserves outgoing P2P credit to GW NI 216B based on the destination, and arbitrates with other commands going to network 110B. Upon successful arbitration, the reflected request is sent to GW NI 216B, where it is forwarded over network 110B to NI 212B, which routes it to destination agent circuit 120D.

Destination agent circuit 120D then generates and returns response message 614, which is routed through NI 212B back over network 110B to GW NI 216B. When response 614 is received at GW NI 216B, it is enqueued in an E2E buffer specific to source 120D and destination 120PC0. P2P credit for an NSM GW queue is then reserved based on the source of response 614 (120D); arbitration occurs with commands from other sources. Upon successful arbitration, GW NI 216B forwards response message 614 to NSM GW circuit 140. Response message 614 bypasses the address decode logic and is enqueued in an outgoing queue for network 110A according to the request's initiator/the response's target (120PC0). P2P credit is then reserved to GW NI 216A based on destination (120PC0); the command then arbitrates with other commands going to network 110A. Upon successful arbitration, response message 614 is forwarded to GW NI 216A, traveling over network 110A back to the transaction's initiator (120PC0).

The reverse of transaction 610 is also possible, in which the initiator is an SoC agent such as 120D, and the target is an agent circuit on network 110A such as processor circuit 120PC0.

Broadcast Flow

Figure 6C:
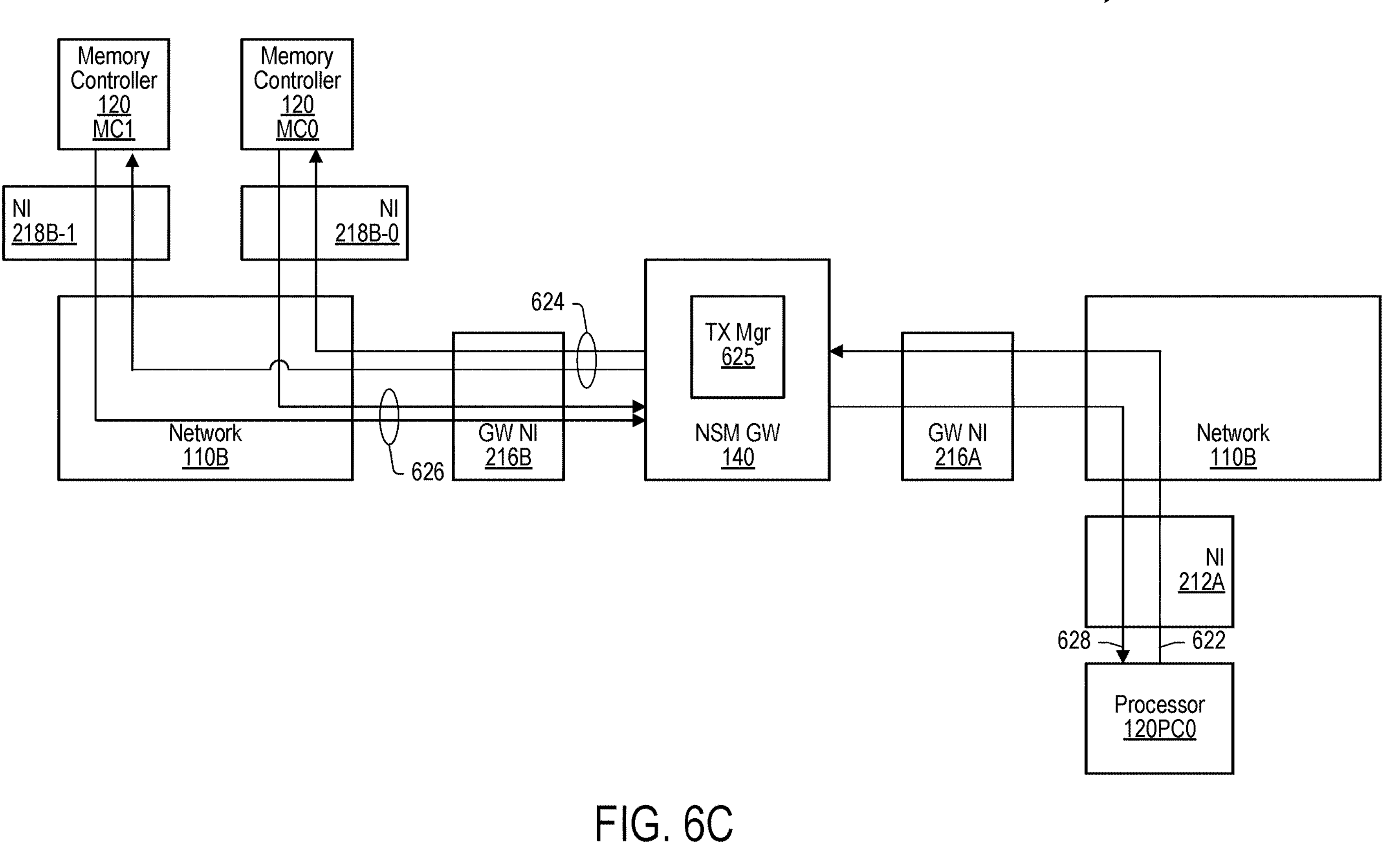
FIG. 6C is a block diagram illustrating a flow for a broadcast non-DRAM transaction through a centralized gateway circuit.

While transactions 600 and 610 previously described had a single initiator and a single target (one-to-one), NSM GW circuit 140 can also facilitate broadcast (i.e., one-to-many) transactions. FIG. 6C is a block diagram that illustrates the flow of one embodiment of a broadcast transaction 620 initiated by processor circuit 120PC to memory controllers 120MC0-1. (As previously noted, although transaction 620 targets memory controllers 120MC0-1, this is still a non-DRAM transaction since transaction 620 merely sets configuration registers within memory controllers 120MC0-1 and does not cause a write to DRAM.) Other elements depicted in FIG. 6C include NSM GW circuit 140 (including a transactions manager 625), GW NIs 216A-B, networks 110A-B, and NIs 212A, 218B-0, and 218B-1 (coupled to processor circuit 120PC0, and memory controllers 120MC0-1, respectively). Transaction 620 includes request message 622, broadcast requests 624, broadcast responses 626, and response message 628.

Transaction 620 begins with processor circuit 120PC0 initiating request 622 to NSM GW circuit 140. Upon receipt, GW NI 216A enqueues request 622 in an incoming E2E buffer specific to the source and destination, reserves P2P credit for the gateway request queue based on the source, and arbitrates with commands from other sources. Upon successful arbitration, GW NI 216A forwards request 622 to NSM GW circuit 140. Request 622 goes through the address decode logic of circuit 140, which determines that request's target is one of the registers located in memory controller broadcast space.

Request 622 is then enqueued in a queue for the broadcast requests from network 110A. These broadcast requests may be handled by a transactions manager 625 in one embodiment. Request 622 is converted into a series of broadcast requests 624 to the broadcast destinations (120MC0-1). To do so, P2P credit for a memory controller broadcast is reserved for a buffer to network 110B. Arbitration then occurs along with other commands going to network 110B.

Broadcast requests 624 travel over network 110B and reach memory controllers 120MC0-1, which initiate broadcast responses 626 back to NSM GW circuit 140. Responses 626 travel over network 110B back to GW NI 216B, where they are enqueued in an E2E buffer, reserve P2P credit for the queue to NSM GW circuit 140 based on the sources 120MC0-1, and arbitrate with commands from other sources. Upon successful arbitration, GW NI 216B forwards responses 626 to NSM GW circuit 140. Responses 626 bypass address decode logic, being forwarded to transaction manager 625 in one embodiment. Transaction manager 625 may accumulate responses 626, track how many have returned and, for read broadcasts, aggregate read response data. After receiving all the responses, transaction manager 625 generates a combined response 628 to the original requester. Transaction manager 625 reserves P2P credit for destination 120PC0 for a buffer to network 110A, and arbitrates with other commands going to network 110A. Response 628 is then forwarded to GW NI 216A via the buffer interface and travels over network back to transaction's initiator 120PC0 via NI 212A. As soon as response 628 is forwarded to this NI interface, transaction manager 625 is available to process the next broadcast transaction.

Network Element Configuration Flow

In addition to centrally routing transactions between agent circuits 120, NSM GW circuit 140 can support other functions, such as accesses to network elements or components, for example the register space of network switches or network interfaces such as those in networks 110A-B. Accesses to these network elements can be initiated as any other non-DRAM transaction by forwarding the request message to the NSM GW circuit 140A or 140B associated with the requestor/initiator agent, which then routes the request to the appropriate network element. A system address map available to NSM GW circuit can identify that a network component is being targeted and route accordingly. If there is more than one gateway circuit in the system, the recipient gateway circuit may need to forward to one of the other gateway circuits for further handling. The targeted network component sends the corresponding response message back to the NSM gateway circuit, which is responsible for forwarding the response back to the original requestor agent.

Figure 6D:
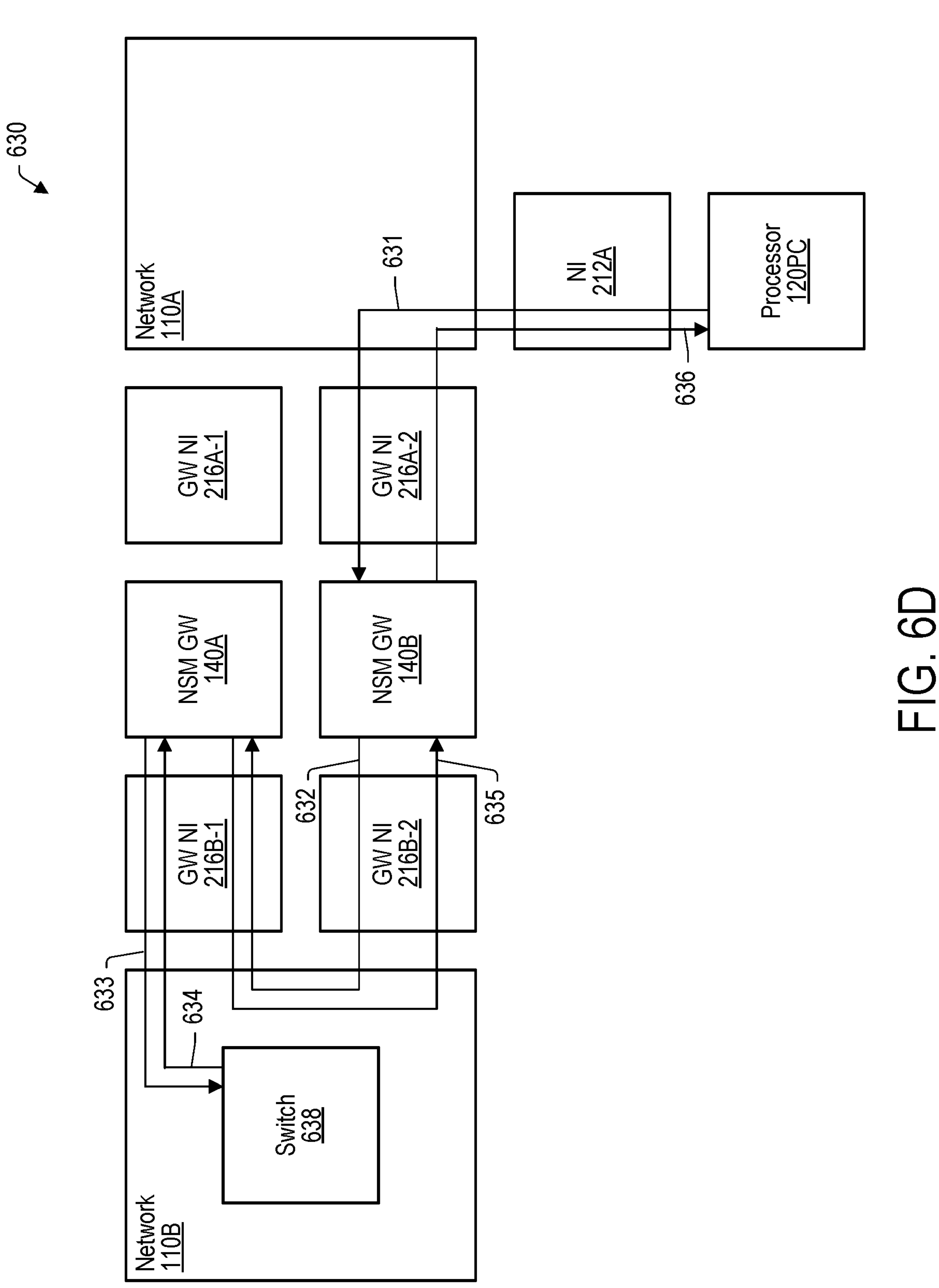
FIG. 6D is a block diagram illustrating a flow for a processor circuit-to-network element non-DRAM transaction through a centralized gateway circuit.

FIG. 6D is a block diagram that illustrates the flow of one example of a non-DRAM transaction that configures a network element. SoC elements depicted include NSM GW circuit instances 140A-B, GW NIs 216A-1, 216A-2, 216B-1, 216B-2, networks 110A-B, and processor circuit 120PC0 (coupled to network 110A via NI 212A). Transaction 630 includes request message 631, reflected request 632, configuration request 633, configuration response 634, and response message 635. In this example, the non-DRAM transaction is initiated by an agent circuit 120PC handled by NSM GW circuit 140B, and then reflected to NSM GW circuit 140A, which processes all configuration requests in the system. The response is returned from NSM GW circuit 140A through NSM GW circuit 140B to the requesting agent.

Transaction 630 begins with processor circuit 120PC sending, through NI 212A and network 110A, request 631 to the gateway circuit assigned to handle its transactions (in this case, NSM GW circuit 140B). GW NI 216A-2 enqueues the request in an E2E buffer, reserves P2P credit for the transfer to NSM GW 140B based on the source (120PC) and arbitrates with commands from other sources. Upon successful arbitration, GW NI 216B-2 forwards the request to NSM GW circuit 140B. Request 631 goes through address decode logic, which determines that the request's target is a register within one of the network switches, switch register 638, located within the configuration space of network 110B.

Request 631 is then enqueued in a queue for transactions from network 110A heading to NSM GW circuit 140A via network 110B, which in this embodiment handles all configuration transactions in the system. Reflected request 632 reserves credit for a transfer to NSM GW circuit 140A and arbitrates with other commands going to network 110B. Reflected request 632 is forwarded to GW NI 216B-2 and travels over network 110B to NSM GW circuit 140A. GW NI 216B-1 receives reflected request 632, enqueues it in an E2E buffer, reserves P2P credit for the transfer to circuit 140A based on its source circuit 140B), and arbitrates with commands from other sources. Upon successful arbitration, GW NI 216B-2 then forwards reflected request 632 to NSM GW circuit 140A. Request 632 goes through the address decode logic in circuit 140A and, in one embodiment, enqueues in a queue of a transactions manager (not pictured) that handles configuration commands.

In one embodiment, reflected request 632 reaches the head of the queue of a transaction manager. The transaction manager may be set up to manage one configuration transaction at the time; other configuration transactions are held in queues in gateway circuits 140 until reaching the head of their respective queue and the transaction manager is ready to accept the next request. When the transaction manager is available, configuration request 633 is generated, which reserves P2P credit for transfer to network 110B (this credit can be guaranteed to always be available if only one reflected configuration transaction is allowed at a time).

Upon successful arbitration with other commands going to network 110B, configuration request 633 travels over network 110B and reaches target network switch 638, which returns configuration response 634 to NSM GW circuit 140A. Configuration response 634 travels over network 110B back to GW NI 216B-1, where it is enqueued in an E2E buffer. P2P credit for transfer to circuit 140A is reserved based on its source (here, configuration request 633).

Upon successful arbitration vis-à-vis commands from other sources, GW NI 216B-1 forwards the response to NSM GW circuit 140A. Configuration response 634 bypasses address decode logic and is forwarded directly to the transaction manager in one embodiment. The transaction manager reserves P2P credit for transfer to network 110B and arbitrates with other outgoing commands. Reflected response 635 is then forwarded to GW NI 216B-2. GW NI 216B-2 receives reflected response 635, enqueues it in an E2E buffer, reserves queue P2P credit based on the source (NSM GW circuit 140A) and arbitrates with commands from other sources. GW NI 216B-2 subsequently forwards reflected response 635 to NSM GW circuit 140B.

Reflected response 635 bypasses address decode logic and is enqueued in the queue for traffic from network 110B corresponding to network 110A responses. Response 636 (which is responsive to original request 631) is generated, reserves P2P credit for processor circuit 120PC for transfer to GW NI 216A-2, and arbitrates with other commands going to network 110A. Response 636 is forwarded to NI 212A and subsequently travels over network 110A back to processor circuit 120PC.

NSM GW Circuit Register Access Flow

Figure 6E:
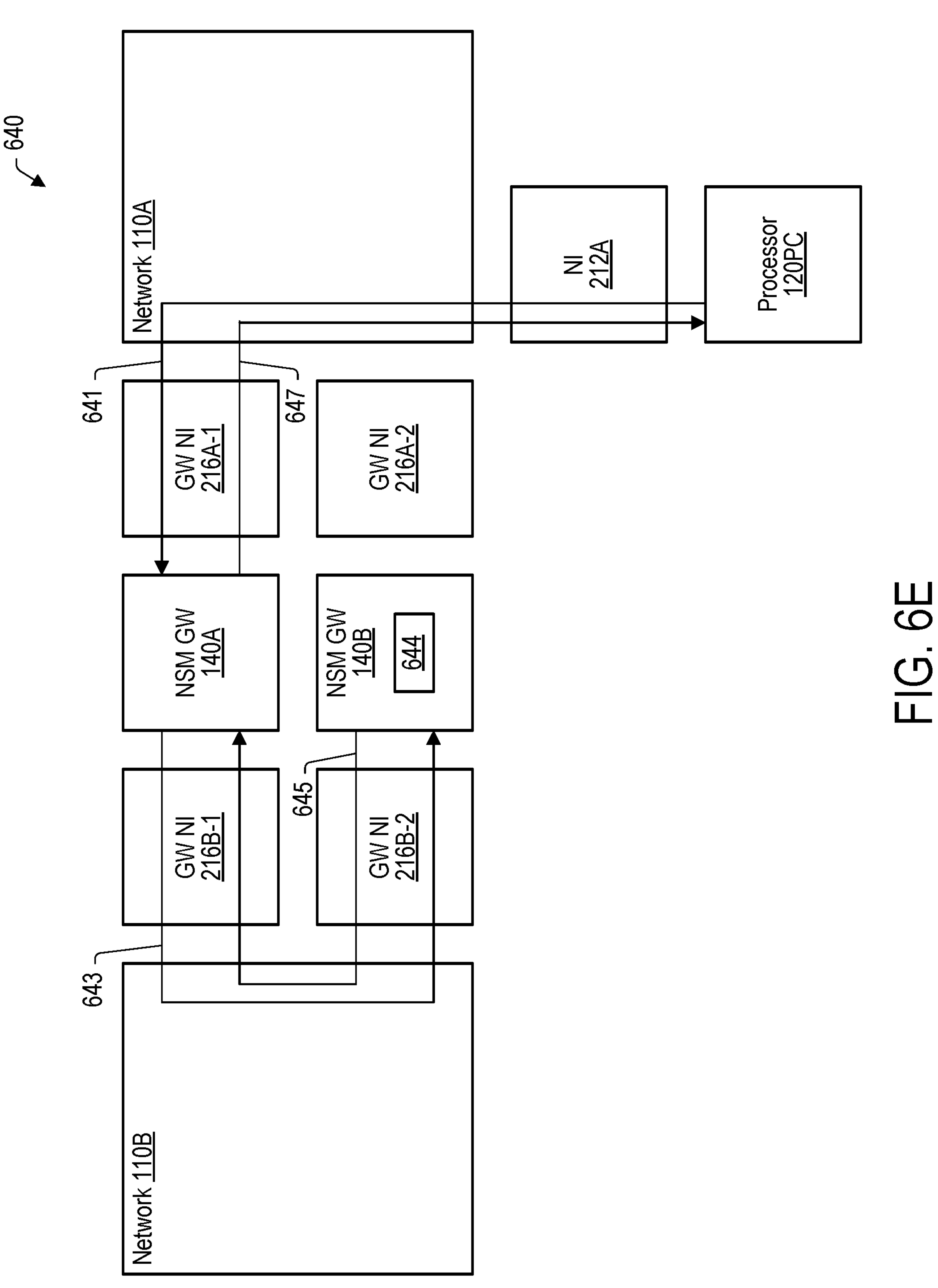
FIG. 6E is a block diagram illustrating a flow for a processor circuit to update a configuration register of a centralized gateway circuit.

FIG. 6E is a block diagram that illustrates the flow of one embodiment of a non-DRAM transaction that accesses registers within NSM GW circuit 140. SoC elements depicted include NSM GW circuit instances 140A-B, GW NIs 216A-1, 216A-2, 216B-1, 216B-2, networks 110A-B, and processor circuit 120PC (coupled to network 110A via NI 212A). Transaction 640 includes request message 641 and response message 647, among others.

In this example, there are two instances of NSM GW circuit 140. NSM GW circuits 140A-B are configured so that they are responsible for the initial receipt of non-DRAM transactions from predetermined agent circuits 120. This example illustrates an access to configuration registers of NSM GW 140B that originates from processor circuit 120PC. Because agent circuit 120PC is assigned to NSM GW circuit 140A, the configuration register access is first sent to NSM GW circuit 140A, where it is then passed to NSM GW circuit 140B over network 110B. Note that a configuration register access to NSM GW circuit 140A by processor circuit 120PC would not require cross-gateway communication.

Transaction 640 begins with processor circuit 120PC sending request 641 to NSM GW circuit 140A via NI 212A and network 110A. GW NI 216A-1 enqueues request 641 in an E2E buffer, reserves P2P credit for the transfer to circuit 140A based on the source (120PC), and arbitrates with commands from other sources for access to NSM GW circuit 140A. Upon successful arbitration, GW NI 216A-1 forwards request 641 to NSM GW circuit 140A. There, request 641 goes through address decode logic, which determines that the request target is a register 644 within NSM GW circuit 140B.

Gateway request 643 is then reflected by NSM GW circuit 140A and placed in a queue for requests heading to NSM GW circuit 140B from NSM GW circuit 140A. P2P credit is then reserved for gateway request 643 for the transfer to network 110B and NSM GW circuit 140B. Gateway request 643 arbitrates with other commands for access to GW NI 216B-1 and network 110B. Upon successful arbitration, gateway request 643 is forwarded to GW NI 216B-1 and travels over network 110B. GW NI 216B-2 receives gateway request 643, enqueues it in an E2E buffer, reserves P2P credit for transfer to circuit 140B based on the source of request 643 (NSM GW circuit 140A), and arbitrates with commands from other sources for access to NSM GW circuit 140B. After successful arbitration, GW NI 216B-2 forwards gateway request 643 to NSM GW circuit 140B.

Request 643 goes through the address decode logic and is queued in a queue of a transactions manager (not pictured) that handles transactions within NSM GW circuit 140B itself. Eventually, the transactions manger performs access to the local registers specified in requests 641 and 643 and constructs a gateway response 645 to be returned to NSM GW circuit 140A. The transactions manager then reserves, based on the destination (NSM GW circuit 140A), P2P credit for the transfer over network 110B, and arbitrates with other commands going to network 110B. Upon successful arbitration, gateway response 645 is forwarded to GW NI 216B-1 and then travels over network 110B.

GW NI 216B-1 receives gateway response 645, enqueues it in an E2E buffer, reserves P2P credit for the transfer to NSM GW circuit 140A based on its source (NSM GW circuit 140B), and arbitrates with commands from other sources. Upon successful arbitration, GW NI 216B-1 forwards gateway response 645 to NSM GW circuit 140A. Gateway response 645 bypasses address decode logic and is placed in a queue for responses originating from network 110B and bound for destinations on network 110A. Gateway response 645 (which becomes response 647) reserves P2P credit for the transfer to GW NI 216A-1, and arbitrates with other commands going to network 110A. Response 647 is forwarded from NSM GW circuit 140A to GW NI 216A-1, where it subsequently travels over network 110A back to agent circuit 120PC via NI 212A.

Example Method

FIG. 7A is a flow diagram of one embodiment of a method for performing a non-DRAM transaction within a computer system that includes a gateway circuit and a plurality of agent circuits. In some implementations, method 700 may be performed solely within an SoC. In other implementations, method 700 may be performed by components in one or more chiplets of a computer system. Representative reference numerals are included in parentheticals throughout the description of this Figure.

Method 700 begins in 704, in which a first circuit of the computer system (e.g., SoC 100) receives network credit of a source agent circuit of the plurality of agent circuits (120) that is coupled to a first packet-switching network (110A) of the computer system. This received network credit reserves routing storage for a non-DRAM transaction. In some embodiments, the first circuit is located within the gateway circuit, while in other embodiments, the first circuit is separate from the gateway circuit. For example, the first circuit may be a network interface (NI) of the gateway circuit (216); the NI may be internal or external to the gateway circuit as desired.

In 708, the gateway circuit receives a request message for a non-DRAM transaction originating from the source agent circuit. This virtual channel may be specific to non-DRAM transactions in some embodiments. The NI of the gateway circuit may receive the request message, and queue the request message for transmission to the gateway circuit. Transmission to the gateway circuit may be performed based on separate credits exchanged between the NI and the gateway circuit in some embodiments. In some implementations, the network credit received by the first circuit is referred to as an end-to-end credit which is used for NI-to-NI transmission over the plurality of networks including the first network, while the credit between the NI and the gateway circuit is referred to as a point-to-point credit that allows forwarding the request message to the gateway circuit.

In 712, the gateway circuit stores the request message in an input buffer (510) reserved for messages originating from the source agent circuit via the first packet-switching network. Thus, if the first network has eight different agent circuits coupled to it, the gateway circuit would include eight different input buffers for transactions originating from the first network. A given agent circuit on the first network, on the other hand, would need to have associated routing storage only for the gateway circuit and not for all possible agent circuit destinations within the computer system.

Next, in 716, the gateway circuit decodes the request message, determining that a particular agent circuit of the plurality of agent circuits—referred to as the destination agent circuit, which is coupled to a second packet-switching network of the plurality of networks—is a destination for the request message. As has been described with respect to FIG. 6A, in some cases the first and second networks may be the same network. In other cases the first and second networks are different (e.g., networks 110A-B). For example, the source agent circuit may be coupled to the first network but not the second network, while the destination agent circuit may be coupled to the second network but not the first network.

In 720, having decoded the request message, the gateway circuit routes the request message to an output buffer reserved for messages bound for the destination agent circuit via the second packet-switching network. The gateway circuit arbitrates in 724 between multiple messages destined for the second packet-switching network. Upon successful arbitration, the gateway circuit outputs the request message in 728.

In 732, the first circuit, which as noted may be an internal or external NI of the gateway circuit, returns network credit to the source agent circuit. Most generally, this return occurs prior to the request message being received by the destination agent circuit. The return of this credit means that the source agent circuit need not wait until later (e.g., receiving a response message from the destination agent circuit) before using the credit for another transaction. The gateway circuit, then, terminates the non-DRAM transaction from the perspective of the source agent circuit, freeing the source agent circuit for further network activity. For example, the NI of the gateway circuit may receive the request message, return network credit to the source agent circuit, send point-to-point credit to the gateway circuit, and forward the request message to the gateway circuit. In other words, credit may be returned to the source agent circuit prior to or concurrently with the gateway circuit actually receiving the request message.

FIG. 7B is a flow diagram of one embodiment of a method for performing non-DRAM transaction within a computer system that includes a gateway circuit and a plurality of agent circuits. In some cases, the computer system is situated on one or more co-packaged integrated circuit dies. In some implementations, method 750 may be performed solely within an SoC. In other implementations, method 750 may be performed by components in one or more chiplets of a computer system. Representative reference numerals are included in parentheticals throughout the description of this Figure.

Method 750 is performed by a gateway circuit (140) within a computer system (100) that has a plurality of agent circuits (120), system memory (130), and a plurality of networks that includes a first network (110A) and a second network (110B). In some implementations, the first and second networks are heterogeneous, packet-switching networks with different ordering properties. Method 750 begins in 754, in which the gateway circuit receives a first request for a non-system-memory transaction, where the first request (e.g., request message 602 of transaction 600) originates from a first agent circuit (e.g., 120PC0) of the plurality of agent circuits that is coupled to the first network but not the second network. In 758, the gateway circuit routes the first request to a second agent circuit (e.g., 120PC1) of the plurality of agent circuits, the second agent circuit being coupled to the first network but not the second network.

Method 750 further includes the gateway circuit, in 762, receiving a second request for a non-system-memory transaction, where the second request originates from a third agent circuit of the plurality of agent circuits that is coupled to the second network but not the first network. In 766, the gateway circuit routes the second request to a fourth agent circuit of the plurality of agent circuits, the fourth agent circuit being coupled to the second network but not the first network. The second request is thus analogous to transaction 600 described with respect to FIG. 6A.

Still further, method 750 includes the gateway circuit, in 770, receiving a third request for a non-system-memory transaction, where the third request (e.g., request message 612 of transaction 610) originates from a fifth agent circuit (120PC0) of the plurality of agent circuits that is coupled to the first network but not the second network. In 774, the gateway circuit routes the third request to a sixth agent circuit (e.g., 120D) of the plurality of agent circuits, the sixth agent circuit being coupled to the second network but not the first network. Accordingly, the gateway circuit is capable of routing several different types of transactions.

In other variations, method 750 may further include receiving, at the gateway circuit, a fourth request for a non-system-memory transaction, wherein the fourth request is a broadcast request (e.g., request message 622 of transaction 620) that originates from a seventh agent circuit (120PC) of the plurality of agent circuits that is coupled to the first network. The gateway circuit may then route the fourth request to two or more agent circuits (e.g., 120MC0-1) of the plurality of agent circuits that are coupled to the second network. Method 750 may still further include the gateway circuit receiving a fifth request for a non-system-memory transaction, wherein the fifth request (e.g., request message 631 of transaction 630) is a network element configuration request that originates from an eighth agent circuit (120PC) of the plurality of agent circuits that is coupled to the first network. The gateway circuit may then route the fifth request to a network element of the first or second network specified by the fifth request. For example, the network element may be a network switch register (638). In some cases, routing the fifth request includes sending the fifth request to another instance of the gateway circuit (e.g., from 140A to 140B, or vice-versa) for further handling.

Example Applications

Figure 8:
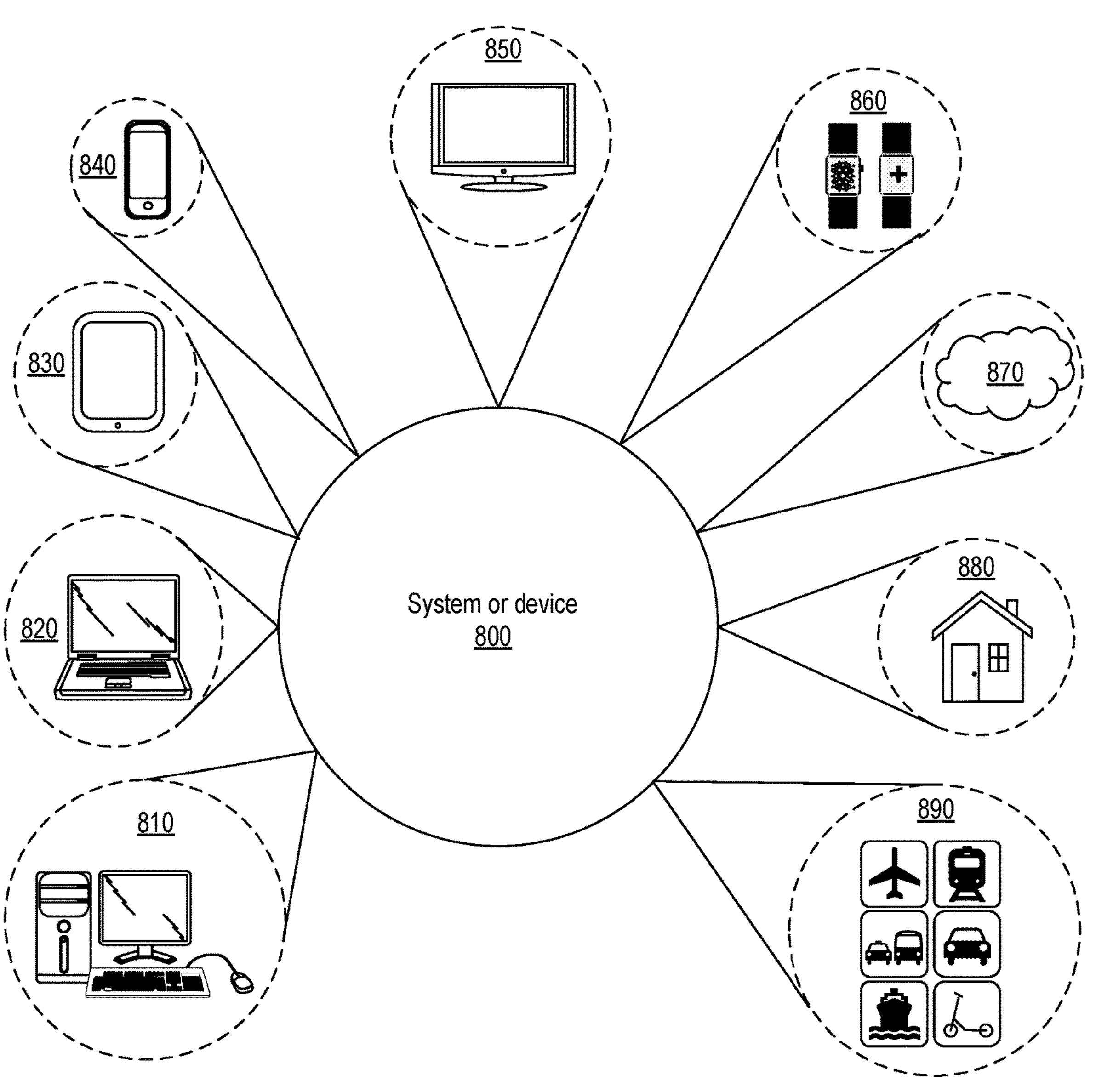
FIG. 8 is a diagram illustrating example applications for systems and devices employing the disclosed techniques.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such s contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 9:
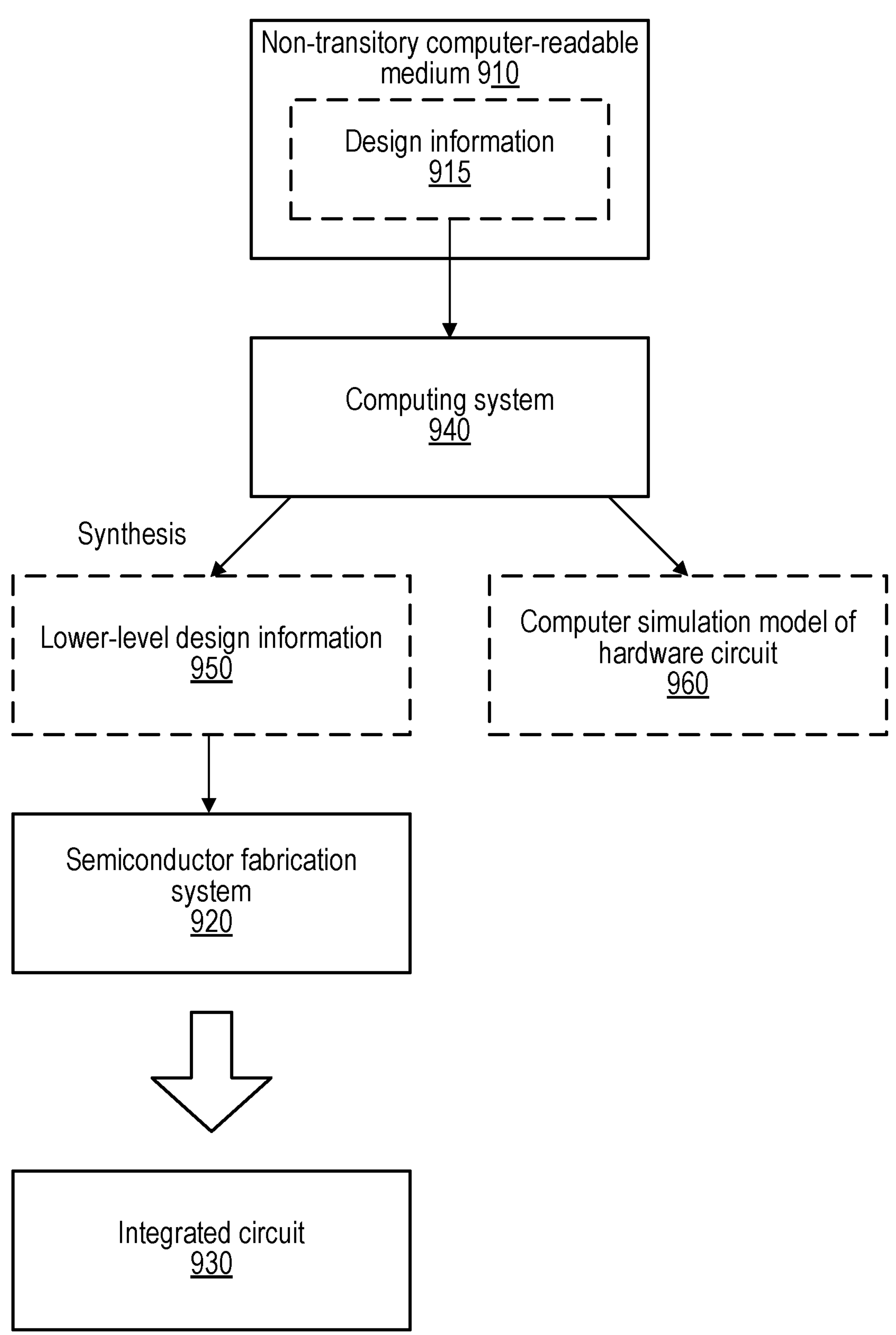
FIG. 9 is a block diagram illustrating an example computer-readable medium that stores circuit design information for implementing devices that employ the disclosed techniques.

FIG. 9 is a block diagram illustrating an example non-transitory computer-readable storage medium that stores circuit design information, according to some embodiments. In the illustrated embodiment, computing system 940 is configured to process the design information. This may include executing instructions included in the design information, interpreting instructions included in the design information, compiling, transforming, or otherwise updating the design information, etc. Therefore, the design information controls computing system 940 (e.g., by programming computing system 940) to perform various operations discussed below, in some embodiments.

In the illustrated example, computing system 940 processes the design information to generate both a computer simulation model of a hardware circuit 960 and lower-level design information 950. In other embodiments, computing system 940 may generate only one of these outputs, may generate other outputs based on the design information, or both. Regarding the computing simulation, computing system 940 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 940 also processes the design information to generate lower-level design information 950 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 950 (potentially among other inputs), semiconductor fabrication system 920 is configured to fabricate an integrated circuit 930 (which may correspond to functionality of the simulation model 960). Note that computing system 940 may generate different simulation models based on design information at various levels of description, including information 950, 915, and so on. The data representing design information 950 and model 960 may be stored on medium 99 or on one or more other media.

In some embodiments, the lower-level design information 950 controls (e.g., programs) the semiconductor fabrication system 920 to fabricate the integrated circuit 930. Thus, when processed by the fabrication system, the design information may program the fabrication system to fabricate a circuit that includes various circuitry disclosed herein.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Accordingly, non-transitory computer-readable storage medium 910 may include two or more memory media; such media may reside in different locations—for example, in different computer systems that are connected over a network.

Design information 915 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 940, semiconductor fabrication system 920, or both. In some embodiments, design information may also include one or more cell libraries that specify the synthesis, layout, or both of integrated circuit 930. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 930 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 and model 960 are configured to operate according to a circuit design specified by design information 915, which may include performing any of the functionality described herein. For example, integrated circuit 930 may include any of various elements shown in FIGS. 1-6. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 920 to fabricate integrated circuit 930.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—

[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:

a computer system situated on one or more co-packaged integrated circuits (ICs), wherein the computer system includes:

a plurality of networks that includes a first network having a first set of network hardware and a second network having a second, different set of network hardware;

a plurality of agent circuits configured to send and/or receive transactions over one or more of the plurality of networks, wherein the plurality of agent circuits includes:

one or more processor circuits connected to the first network but not the second network; and one or more memory controllers configured to couple to system memory that includes dynamic random-access memories (DRAMs), the one or more memory controllers being coupled to the first and second networks; and a non-system-memory gateway (NSM GW) circuit coupled to the first network and the second network and configured to route a non-DRAM transaction from a source agent circuit of the plurality of agent circuits to a destination agent circuit of the plurality of agent circuits without a first network interface (NI) of the source agent circuit using routing storage that is dedicated to the destination agent circuit, and without a second NI of the destination agent circuit using routing storage that is dedicated to the source agent circuit.

2. The apparatus of claim 1, wherein the non-DRAM transaction is routed via a virtual channel that is implemented using an input buffer and an output buffer in the NSM GW circuit, the input buffer being dedicated to the source agent circuit and the output buffer being dedicated to the destination agent circuit, wherein the virtual channel prevents blocking on other types of concurrent transactions involving the plurality of agent circuits.

3. The apparatus of claim 1, wherein the plurality of agent circuits includes:

a plurality of input/output (I/O) devices coupled to the second network but not the first network; and a plurality of graphics processing units (GPUs) coupled to a third network of the plurality of networks, the third network having a third set of network hardware that is different from the first set of network hardware and the second set of network hardware; and wherein the plurality of networks have different ordering properties.

4. The apparatus of claim 1, wherein the NSM GW circuit includes:

a first set of input buffers for storing information regarding incoming transactions from sources on the first network;

a second set of input buffers for storing information regarding incoming transactions from sources on the second network;

a first set of output buffers for storing information regarding transactions to be routed to destinations on the first network;

a second set of output buffers for storing information regarding transactions to be routed to destinations on the second network;

a routing circuit configured to perform address decoding and route incoming transactions corresponding to information stored in the first and second sets of input buffers to specified ones of the first and second sets of output buffer; and a first arbitration circuit configured to select transactions corresponding to information stored in the first set of output buffers for dissemination on the first network; and a second arbitration circuit to select transactions corresponding to information stored in the first set of output buffers for dissemination on the second network.

5. The apparatus of claim 1, wherein the one or more processor circuits include a plurality of processor circuits coupled to the first network, wherein the NSM GW circuit includes a first gateway sub-circuit and a second gateway sub-circuit, wherein the first gateway sub-circuit is configured to initially route non-DRAM transactions originating from a first subset of the plurality of processor circuits, and wherein the second gateway sub-circuit is configured to initially route non-DRAM transactions originating from a second, non-overlapping subset of the plurality of processor circuits.

6. The apparatus of claim 5, wherein the first gateway sub-circuit is configured to route a particular non-DRAM transaction from an origin agent circuit within the first subset of processor circuits to the second gateway sub-circuit in response to the particular non-DRAM transaction specifying a target agent circuit within the second subset of processor circuits.

7. The apparatus of claim 1, wherein the computer system is formed on a first of a plurality of integrated circuit (IC) dies of the apparatus, and wherein the NSM GW circuit is configured to route an inter-die non-DRAM transaction to a second NSM GW circuit located within a second computer system formed on a second of the plurality of IC dies.

8. The apparatus of claim 1, wherein the NSM GW circuit is configured to maintain a routing table that specifies currently permissible non-DRAM transactions, and wherein the apparatus is configured to:

specify a limited set of non-DRAM transactions permitted by the NSM GW circuit during system boot; and expand the limited set of non-DRAM transactions permitted by the NSM GW circuit upon completion of system boot.

9. The apparatus of claim 1, wherein the apparatus is configured to perform at least one non-DRAM transaction that bypasses the NSM GW circuit, the at least one non-DRAM transaction including a cache coherency operation on the first network.

10. The apparatus of claim 1, wherein the NSM GW circuit, in response to a request message of the non-DRAM transaction, is configured to act as a termination point for the request message by returning network credit to the source agent circuit for the request message prior to the destination agent circuit receiving the request message.

11. A method, comprising:

receiving, at a first circuit of a computer system having a plurality of agent circuits including a source agent circuit, network credit of the source agent circuit that reserves routing storage for a non-DRAM transaction, the source agent circuit being coupled to a first packet-switching network of the computer system, and the computer system being situated on one or more co-packaged integrated circuits (ICs);

receiving, at a gateway circuit of the computer system, a request message for a non-DRAM transaction originating from the source agent circuit;

storing, by the gateway circuit, the request message in an input buffer reserved for messages originating from the source agent circuit via the first packet-switching network;

decoding, by the gateway circuit, the request message to determine that a destination agent circuit of the plurality of agent circuits is a destination for the request message, the destination agent circuit being coupled to a second packet-switching network of the plurality of packet-switching networks;

routing, by the gateway circuit, the request message to an output buffer reserved for messages bound for the destination agent circuit via the second, different packet-switching network;

arbitrating, by the gateway circuit, between multiple messages destined for the second packet-switching network;

upon successful arbitration, outputting, by the gateway circuit, the request message; and returning, by the first circuit, network credit to the source agent circuit prior to the request message being received by the destination agent circuit.

12. The method of claim 11, wherein the first circuit is located within the gateway circuit.

13. The method of claim 11, wherein the first circuit is a network interface (NI) of the gateway circuit through which the gateway circuit receives the request message, and wherein the network credit is for NI-to-NI transmission over the first packet-switching network, the method further comprising the NI:

receiving the request message;

returning network credit to the source agent circuit;

sending point-to-point credit to the gateway circuit; and forwarding the request message to the gateway circuit.

14. The method of claim 11, wherein the first packet-switching network is the same as the second packet-switching network.

15. An apparatus, comprising:

a computer system situated on one or more co-packed integrated circuits (ICs), wherein the computer system includes:

a plurality of networks that includes a first network having a first set of network hardware and a second network having a second, different set of network hardware;

a plurality of agent circuits configured to send and/or receive transactions over one or more of the plurality of networks, wherein the plurality of agent circuits includes:

one or more processor circuits connected to the first network but not the second network; and one or more memory controllers configured to couple to system memory that includes dynamic random-access memories (DRAMs); and a non-system-memory gateway (NSM GW) circuit coupled to the first network and the second network and configured to:

receive, from a source agent circuit of the plurality of agent circuits located on the first network, a request message for a non-DRAM transaction;

route the request message to a destination agent circuit of the plurality of agent circuits that is specified in the request message and that is located on the second network; and act as a termination point for the non-DRAM transaction such that the computer system returns network credit to the source agent circuit for the request message prior to the destination agent circuit receiving the request message.

16. The apparatus of claim 15, wherein the computer system is configured to return the network credit to the source agent circuit upon receipt of the request message by a first network interface (NI) of the NSM GW circuit that is coupled to the first network.

17. The apparatus of claim 16, wherein an NI of the source agent circuit is configured to store the request message in a buffer dedicated to the NSM GW circuit, and wherein the NI of the source agent circuit does not include routing storage dedicated to the destination agent circuit.

18. The apparatus of claim 17, wherein the first NI of the NSM GW circuit includes routing storage dedicated to the source agent circuit, and wherein a second NI of the NSM GW circuit coupled to second network includes routing storage dedicated to the destination agent circuit.

19. The apparatus of claim 18, wherein an NI of the destination agent circuit is configured to store the request message in a buffer dedicated to the NSM GW circuit, and wherein the NI of the destination agent circuit does not include routing storage dedicated to the source agent circuit.

20. The apparatus of claim 15, wherein a given one of the one or more memory controllers are coupled to receive DRAM transactions from agent circuits on both the first and second networks.

* * * * *